(12) United States Patent
Sakai

(10) Patent No.: US 10,138,825 B2
(45) Date of Patent: Nov. 27, 2018

(54) CONTROL SYSTEM FOR INTERNAL COMBUSTION ENGINE, INTERNAL COMBUSTION ENGINE AND METHOD OF CONTROLLING INTERNAL COMBUSTION ENGINE

(71) Applicant: TOYOTA JIDOSHA KABUSHIKI KAISHA, Aichi-ken (JP)

(72) Inventor: Hiroyuki Sakai, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 171 days.

(21) Appl. No.: 15/430,360

(22) Filed: Feb. 10, 2017

(65) Prior Publication Data

US 2017/0234249 A1 Aug. 17, 2017

(30) Foreign Application Priority Data

Feb. 15, 2016 (JP) .................................. 2016-025769

(51) Int. Cl.
| | |
|---|---|
| *F02D 41/00* | (2006.01) |
| *F02D 41/14* | (2006.01) |
| *F02D 41/38* | (2006.01) |
| *F02D 41/40* | (2006.01) |
| *F02M 43/04* | (2006.01) |

(Continued)

(52) U.S. Cl.
CPC ....... *F02D 41/0025* (2013.01); *F02D 19/081* (2013.01); *F02D 35/026* (2013.01); *F02D 35/028* (2013.01); *F02D 41/1497* (2013.01); *F02D 41/3035* (2013.01); *F02D 41/38* (2013.01); *F02D 41/401* (2013.01);

(Continued)

(58) Field of Classification Search
CPC .. F02D 41/0025; F02D 41/3035; F02D 41/38; F02D 41/401; F02D 41/1497; F02D 41/402; F02D 41/3041; F02D 35/026; F02D 19/081; F02D 2041/001; F02D 2041/389;

(Continued)

(56) References Cited

U.S. PATENT DOCUMENTS

| | | | | |
|---|---|---|---|---|
| 5,975,046 A | * | 11/1999 | Kaneko | ............... F01N 13/0097 123/300 |
| 6,213,086 B1 | * | 4/2001 | Chmela | ..................... F02B 1/12 123/179.5 |

(Continued)

FOREIGN PATENT DOCUMENTS

JP 2011-153562 A 8/2011

*Primary Examiner* — Hieu T Vo
*Assistant Examiner* — Sherman Manley
(74) *Attorney, Agent, or Firm* — Hauptman Ham, LLP

(57) ABSTRACT

A control system includes a processor for controlling an internal combustion engine having a temperature region, wherein a change of ignition delay time accompanying a rise in a cylinder temperature when the cylinder temperature is in the temperature region is smaller than when the cylinder temperature is out of the temperature region. When a self ignition timing of secondary fuel is earlier than a self ignition timing of primary fuel due to the secondary fuel being injected at a crank angle at which the cylinder temperature is higher than the temperature region, the processor controls a ratio of the secondary fuel to be lower than when the self ignition timing of the secondary fuel is later than the self ignition timing of the primary fuel due to the secondary fuel being injected at a crank angle at which the cylinder temperature is within the temperature region.

9 Claims, 14 Drawing Sheets

(51) Int. Cl.
*F02D 41/30* (2006.01)
*F02D 19/08* (2006.01)
*F02D 35/02* (2006.01)

(52) U.S. Cl.
CPC ........... *F02D 41/402* (2013.01); *F02M 43/04* (2013.01); *F02D 41/3041* (2013.01); *F02D 2041/001* (2013.01); *F02D 2041/389* (2013.01); *F02D 2200/022* (2013.01); *F02D 2200/10* (2013.01); *Y02T 10/36* (2013.01); *Y02T 10/44* (2013.01)

(58) Field of Classification Search
CPC .......... F02D 2200/022; F02D 2200/10; F02M 43/04; Y02T 10/44; Y02T 10/36
See application file for complete search history.

(56) References Cited

U.S. PATENT DOCUMENTS

| | | | | |
|---|---|---|---|---|
| 6,230,683 | B1* | 5/2001 | zur Loye | F02B 1/12 |
| | | | | 123/27 GE |
| 2005/0247283 | A1* | 11/2005 | Lampard | F02B 19/02 |
| | | | | 123/288 |
| 2006/0180099 | A1* | 8/2006 | Aimoto | F02B 51/02 |
| | | | | 123/1 A |
| 2010/0312455 | A1* | 12/2010 | Yamashita | F02D 13/0207 |
| | | | | 701/103 |
| 2013/0255641 | A1* | 10/2013 | Pien | F02B 75/00 |
| | | | | 123/48 R |
| 2015/0247446 | A1* | 9/2015 | Doenitz | F02B 5/00 |
| | | | | 60/273 |

\* cited by examiner

CONTROL SYSTEM FOR INTERNAL COMBUSTION ENGINE, INTERNAL COMBUSTION ENGINE AND METHOD OF CONTROLLING INTERNAL COMBUSTION ENGINE

CROSS-REFERENCE TO RELATED APPLICATION

This application claims priority based on Japanese Patent Application No. 2016-025769 filed with the Japan Patent Office on Feb. 15, 2016, the entire contents of which are incorporated into the present specification by reference.

TECHNICAL FIELD

Embodiments of the present disclosure relates to a control system for an internal combustion engine.

BACKGROUND ART

JP2011-153562A discloses, as a control system of a conventional internal combustion engine, a system configured so as to make premixed gas burn by compression ignition in part of the engine operating region.

SUMMARY

According to an aspect of the present disclosure, there is provided a control system for controlling an internal combustion engine. The internal combustion engine is provided with a fuel injector configured to inject fuel into a cylinder of an engine body. The internal combustion engine has a temperature region, wherein, during chemical reactions of fuel in a compression stroke in a cycle where premixed gas is made to burn by compression ignition in a cylinder, a change of ignition delay time accompanying a rise in a cylinder temperature of the cylinder when the cylinder temperature is in the temperature region is smaller than when the cylinder temperature is out of the temperature region. The control system comprises a processor configured to control the fuel injector to successively inject primary fuel and secondary fuel into the cylinder to burn the premixed gas by compression ignition in the cylinder. When the self ignition timing of the secondary fuel would become earlier than the self ignition timing of the primary fuel injected at a predetermined crank angle due to the secondary fuel being injected at a crank angle at which the cylinder temperature is higher than an upper boundary temperature of the temperature region, the processor controls the ratio of the secondary fuel in the total fuel injection amount of the primary fuel and secondary fuel to be lower than when the self ignition timing of the secondary fuel is later than the self ignition timing of the primary fuel injected at a predetermined crank angle due to the secondary fuel being injected at a crank angle at which the cylinder temperature is within the temperature region.

According to a further aspect of the present disclosure, an internal combustion engine comprising the above described control system is provided.

According to another aspect of the present disclosure, a method of controlling an internal combustion engine as described above is provided.

DESCRIPTION OF EMBODIMENTS

Figure 1:
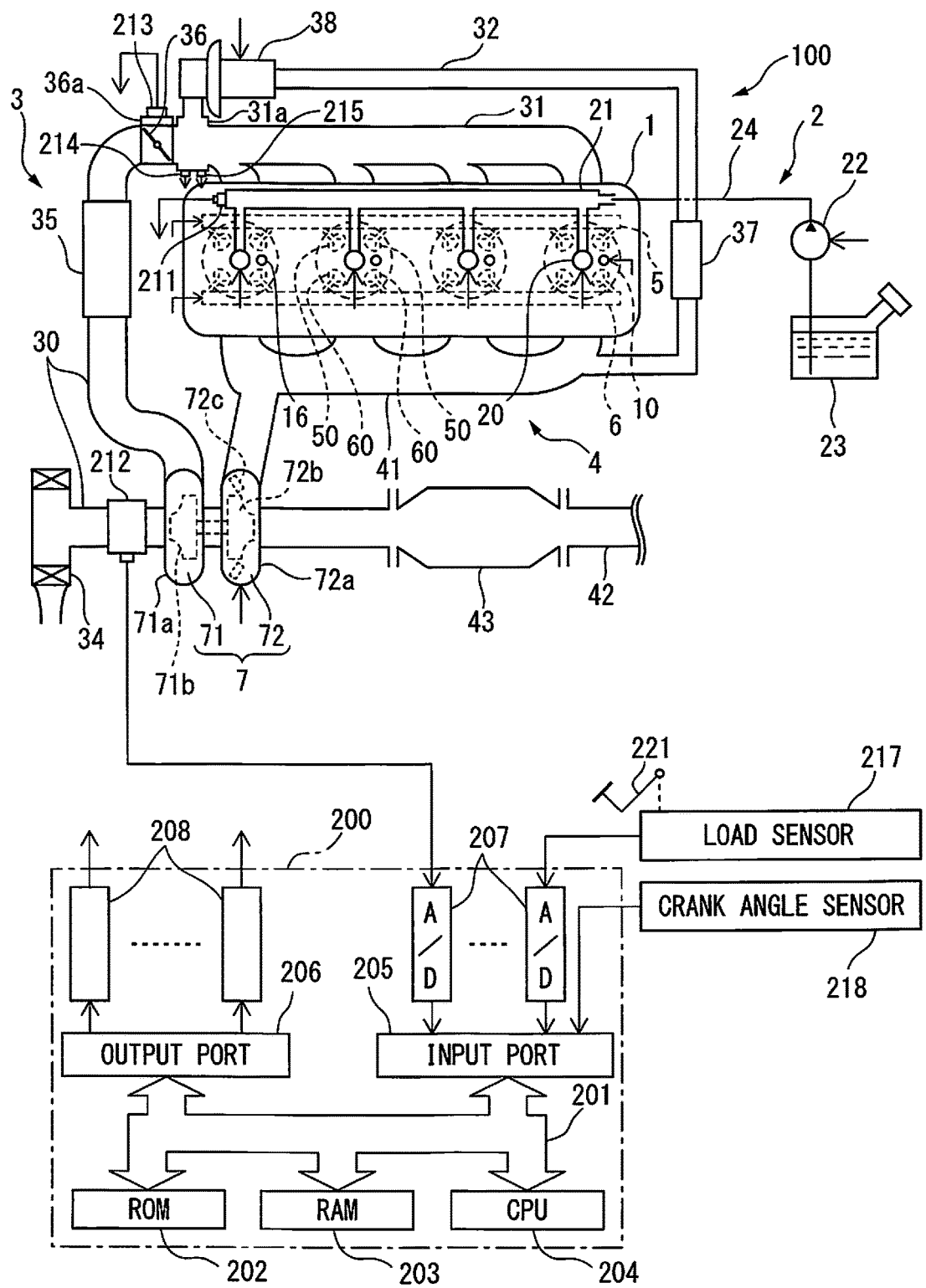
FIG. 1 is a schematic view of the constitution of an internal combustion engine and an electronic control unit controlling the internal combustion engine according to a first embodiment of the present disclosure.

Below, referring to the drawings, embodiments of the present disclosure will be explained in detail. Note that, in the following explanation, similar component elements are assigned the same reference notations.

First Embodiment

Figure 2:
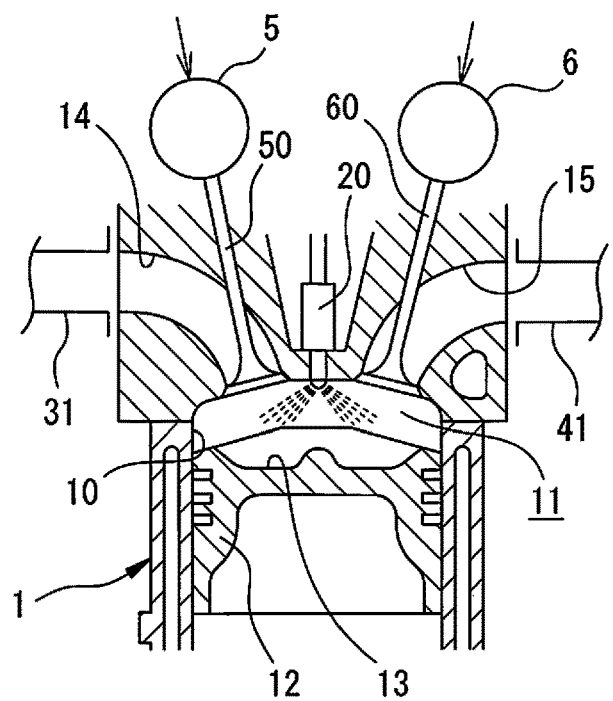
FIG. 2 is a cross-sectional view of an engine body of an internal combustion engine.

FIG. 1 is a schematic view of the constitution of an internal combustion engine 100 and an electronic control unit 200 controlling the internal combustion engine 100 according to a first embodiment of the present disclosure. FIG. 2 is a cross-sectional view of an engine body 1 of the internal combustion engine 100.

As shown in FIG. 1, the internal combustion engine 100 comprises an engine body 1 provided with a plurality of cylinders 10, a fuel feed system 2, an intake device 3, an exhaust device 4, an intake valve operating device 5, and an exhaust valve operating device 6.

The engine body 1 burns fuel in combustion chambers 11 formed at the cylinders 10 (see FIG. 2) to for example generate drive force for driving a vehicle etc. The engine body 1 is provided with one spark plug 16 for each cylinder facing the combustion chamber 11 of each cylinder 10. Further, the engine body 1 is provided with a pair of intake valves 50 and a pair of exhaust valves 60 for each cylinder.

The fuel feed system 2 comprises electronically controlled fuel injectors 20, a delivery pipe 21, a feed pump 22, and a fuel tank 23.

Each fuel injector 20 is provided at the engine body 1 so as to be able to inject fuel toward a cavity 13 formed at a top surface of a piston 12 receiving combustion pressure and moving reciprocally inside a cylinder 10 and thereby form a stratified premixed gas. In the present embodiment, the fuel injector 20 is arranged adjoining a spark plug 16. One is provided at each cylinder 10 so as to face the combustion chamber 11 of that cylinder 10. The opening time (injection amount) and opening timing (injection timing) of the fuel injector 20 are changed by control signals from the electronic control unit 200. If the fuel injector 20 is opened, fuel is directly injected from the fuel injector 20 into the combustion chamber 11.

The delivery pipe 21 is connected through a pumping pipe 24 to the fuel tank 23. In the middle of the pumping pipe 24, a feed pump 22 is provided for pressurizing fuel stored in the fuel tank 23 and feeding it to the delivery pipe 21. The delivery pipe 21 temporarily stores the high pressure fuel pumped from the feed pump 22. If a fuel injector 20 is opened, the high pressure fuel stored in the delivery pipe 21 is directly injected from that fuel injector 20 to the inside of a combustion chamber 11. The delivery pipe 21 is provided with a fuel pressure sensor 211 for detecting the fuel pressure inside the delivery pipe 21, that is, the pressure (injection pressure) of fuel injected from a fuel injector 20 to the inside of the cylinder.

The feed pump 22 is configured to be able to be changed in discharge amount. The discharge amount of the feed pump 22 is changed by a control signal from the electronic control unit 200. By controlling the discharge amount of the feed pump 22, the fuel pressure inside the delivery pipe 21, that is, the injection pressure of each fuel injector 20, is controlled.

The intake device 3 is a device for guiding intake air to the inside of a combustion chamber 11 and is configured to be able to change the state of the intake air sucked into the combustion chamber 11 (intake pressure, intake temperature, amount of EGR (exhaust gas recirculation) gas). The intake device 3 comprises an intake passage 30, intake manifold 31, and EGR passage 32.

The intake passage 30 is connected at one end to an air cleaner 34 and is connected at the other end to an intake collector 31a of the intake manifold 31. At the intake passage 30, in order from the upstream side, an air flowmeter 212, compressor 71 of the exhaust turbocharger 7, intercooler 35, and throttle valve 36 are provided.

The air flowmeter 212 detects the flow rate of air flowing through the inside of the intake passage 30 and finally being taken into a cylinder 10.

The compressor 71 comprises a compressor housing 71a and a compressor wheel 71b arranged inside the compressor housing 71a. The compressor wheel 71b is driven to rotate by a turbine wheel 72b of the exhaust turbocharger 7 attached on the same shaft and compresses and discharges intake air flowing into the compressor housing 71a. At the turbine 72 of the exhaust turbocharger 7, a variable nozzle 72c for controlling the rotational speed of the turbine wheel 72b is provided. By using the variable nozzle 72c to control the rotational speed of the turbine wheel 72b, the pressure of the intake air discharged from inside the compressor housing 71a (supercharging pressure) is controlled.

The intercooler 35 is a heat exchanger for cooling the intake air compressed by the compressor 71 and becoming a high temperature by, for example, running air or cooling water.

The throttle valve 36 changes the passage cross-sectional area of the intake passage 30 to adjust the amount of intake air introduced into the intake manifold 31. The throttle valve 36 is driven to operate by a throttle actuator 36a. The throttle sensor 213 detects its opening degree (throttle opening degree).

The intake manifold 31 is connected to an intake port 14 formed in the engine body 1. The intake air flowing in from the intake passage 30 is evenly distributed to the cylinders 10 through the intake port 14. The intake collector 31a of the intake manifold 31 is provided with an intake pressure sensor 214 for detecting the pressure of the intake air sucked into the cylinders (intake pressure) and an intake temperature sensor 215 for detecting the temperature of the intake air sucked into the cylinders (intake temperature).

The EGR passage 32 is a passage for connecting the exhaust manifold 41 and intake collector 31a of the intake manifold 31 and returning part of the exhaust discharged from each cylinder 10 to the intake collector 31a by the pressure difference. Below, the exhaust flowing into the EGR passage 32 will be called the "EGR gas". By making the EGR gas recirculate to the intake collector 31a and in turn the individual cylinders 10, it is possible to reduce the combustion temperature and keep down the discharge of nitrogen oxides (NOX). In the EGR passage 32, in order from the upstream side, an EGR cooler 37 and EGR valve 38 are provided.

The EGR cooler 37 is a heat exchanger for cooling the EGR gas by, for example, running air or cooling water.

The EGR valve 38 is a solenoid valve enabling continuous or stepwise adjustment of the opening degree. The opening degree is controlled by the electronic control unit 200 in accordance with the engine operating state. By controlling the opening degree of the EGR valve 38, the flow rate of the EGR gas recirculated to the intake collector 31a is adjusted.

The exhaust device 4 is a device for discharging exhaust from the cylinders and is comprised of an exhaust manifold 41 and exhaust passage 42.

The exhaust manifold 41 is connected to an exhaust port 15 formed at the engine body 1 and gathers together the exhaust discharged from the cylinders 10 for introduction into the exhaust passage 42.

In the exhaust passage 42, in order from the upstream side, the turbine 72 of the exhaust turbocharger 7 and an exhaust post-treatment device 43 are provided.

The turbine 72 is provided with a turbine housing 72a and a turbine wheel 72b arranged inside the turbine housing 72a. The turbine wheel 72b is driven to rotate by the energy of the exhaust flowing into the turbine housing 72a and drives a compressor wheel 71b attached on the same shaft.

At the outside of the turbine wheel 72b, the above-mentioned variable nozzle 72c is provided. The variable nozzle 72c functions as a throttle valve. The nozzle opening degree (valve opening degree) of the variable nozzle 72c is controlled by the electronic control unit 200. By changing the nozzle opening degree of the variable nozzle 72c, it is possible to change the flow rate of exhaust driving the turbine wheel 72b inside the turbine housing 72a. That is, by changing the nozzle opening degree of the variable nozzle 72c, it is possible to change the rotational speed of the turbine wheel 72b to change the supercharging pressure. Specifically, if reducing the nozzle opening degree of the variable nozzle 72c (throttling the variable nozzle 72c), the flow rate of the exhaust rises, the rotational speed of the turbine wheel 72b increases, and the supercharging pressure increases.

The exhaust post treatment device 43 is a device for cleaning the exhaust, then discharging it into the outside air and is provided with various types of exhaust purification catalysts for removing harmful substances, filters for trapping harmful substances, etc.

The intake valve operating device 5 is a device for driving operation of the intake valve 50 of each cylinder 10 and is provided at the engine body 1. The intake valve operating device 5 according to the present embodiment is configured to for example drive operation of the intake valve 50 by an electromagnetic actuator so as to enable control of the operating timing of the intake valve 50 to any timing. However, the device is not limited to this. It is also possible to configure it to drive operation of the intake valve 50 by the intake camshaft and provide a variable valve operating mechanism at one end part of the intake camshaft to control the oil pressure and thereby change the relative phase angle of the intake camshaft with respect to the crankshaft and enable the operating timing of the intake valve 50 to be controlled to any timing.

The exhaust valve operating device 6 is a device for driving operation of the exhaust valve 60 of each cylinder 10 and is provided at the engine body 1. The exhaust valve operating device 6 according to the present embodiment is configured so as to make the exhaust valve 60 of the each cylinder 10 open during the exhaust stroke and to enable opening even during the intake stroke in accordance with need. In the present embodiment, as such an exhaust valve operating device 6, an electromagnetic actuator controlled by the electronic control unit 200 is employed. By driving operation of the exhaust valve 60 of each cylinder 10 by an electromagnetic actuator, the operating timing and lift of the exhaust valve 60 are controlled to any timing and lift. Note that, the exhaust valve operating device 6 is not limited to an electromagnetic actuator. For example, it is also possible to employ a valve operating device changing the operating time or lift of an exhaust valve 60 by changing the cam profile by oil pressure etc.

The electronic control unit 200 is comprised of a digital computer provided with components connected with each other by a bidirectional bus 201 such as a ROM (read only memory) 202, RAM (random access memory) 203, CPU (microprocessor) 204, input port 205, and output port 206.

The input port 205 receives as input the output signals of the above-mentioned fuel pressure sensor 211 etc. through the corresponding AD converters 207. Further, the input port 205 receives as input, as a signal for detecting the engine load, the output voltage of a load sensor 217 generating an output voltage proportional to the amount of depression of the accelerator pedal 220 (below, referred to as "the amount of accelerator depression") through the corresponding AD converter 207. Further, the input port 205 receives as input, as a signal for calculating the engine rotational speed etc., the output signal of a crank angle sensor 218 generating an output pulse each time the crankshaft of the engine body 1 rotates for example by 15°. In this way, the input port 205 receives as input the output signals of various types of sensors required for control of the internal combustion engine 100.

The output port 206 is connected to the fuel injectors 20 and other controlled parts through the corresponding drive circuits 208.

The electronic control unit 200 outputs control signals for controlling the various controlled parts from the output port 206 to control the internal combustion engine 100 based on the output signals of the various types of sensors input to the input port 205. Below, the control of the internal combustion engine 100 performed by the electronic control unit 200 will be explained.

The electronic control unit 200 switches the operating mode of the engine body 1 to either a spark ignition operating mode (below, referred to as the "SI operating mode") or a compression ignition operating mode (below, referred to as the "CI operating mode") based on the engine operating state (engine rotational speed and engine load).

Figure 3:
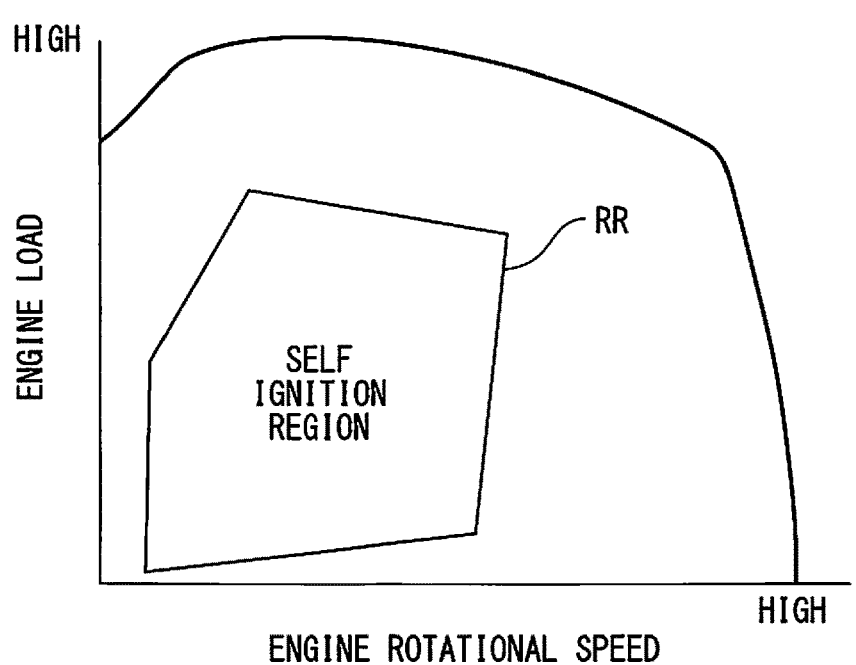
FIG. 3 is a view showing an operating region of an engine body.

Specifically, if the engine operating state is in the self ignition region RR surrounded by the solid lines in FIG. 3, the electronic control unit 200, as shown in FIG. 3, switches the operating mode to the CI operating mode, while if it is in a region other than the self ignition region RR, it switches the operating mode to the SI operating mode. Further, the electronic control unit 200 controls the fuel injector 20 etc. in accordance with the various operating modes.

When the operating mode is the SI operating mode, the electronic control unit 200 basically forms premixed gas of the stoichiometric air-fuel ratio or near the stoichiometric air-fuel ratio inside the combustion chamber 11, ignites it by the spark plug 16, and burns that premixed gas by flame propagation to operate the engine body 1.

Further, when the operating mode is the CI operating mode, the electronic control unit 200 basically forms premixed gas of a leaner air-fuel ratio than the stoichiometric air-fuel ratio (for example 30 to 40 or so) inside the combustion chamber 11 and burns that premixed gas by compression ignition to operate the engine body 1. In the present embodiment, as premixed gas, stratified premixed gas having a burnable layer at the center part in the combustion chamber 11 and having an air layer around the cylinder inside walls is formed.

The premixed gas may be burned by compression ignition by making the air-fuel ratio leaner than with burning by flame propagation and, further, by making the compression ratio higher. For this reason, by making the premixed gas burn by compression ignition, it is possible to improve the fuel economy and possible to improve the heat efficiency. Further, burning the premixed gas by compression ignition results in a lower combustion temperature than with combustion by spark ignition, so it is possible to suppress the generation of NOX. Furthermore, there is sufficient oxygen around the fuel, so formation of unburned HC can be suppressed.

Figure 4A:
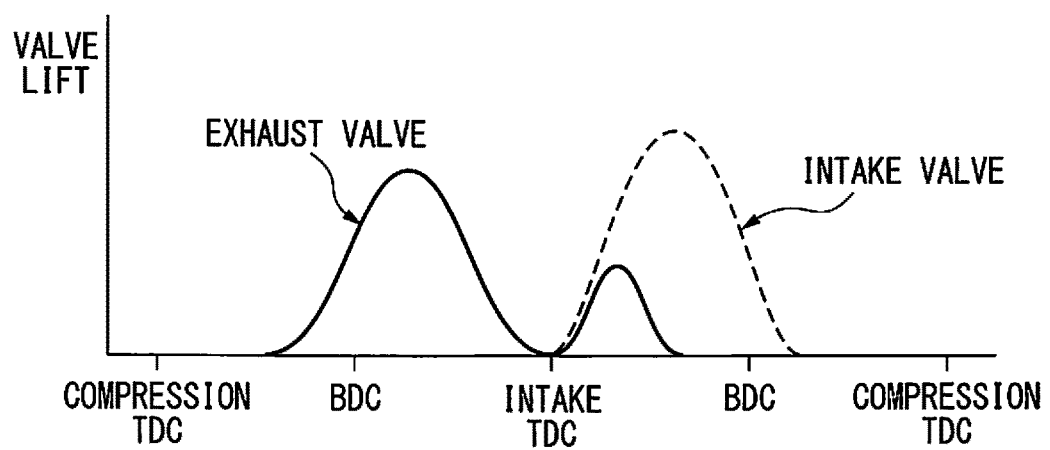
FIG. 4A is a view showing an example of an opening operation of an intake valve and exhaust valve during a CI operating mode.
Figure 4B:
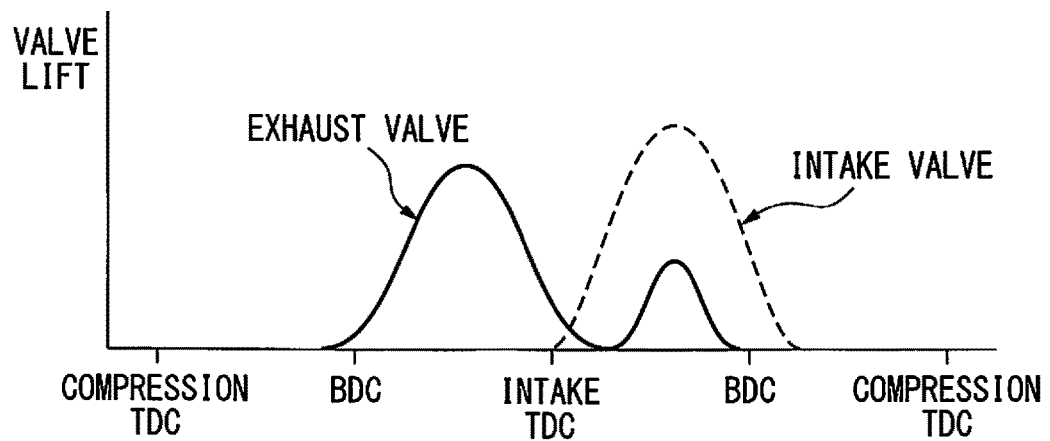
FIG. 4B is a view showing an example of an opening operation of an intake valve and exhaust valve during a CI operating mode.

Note that, to make the premixed gas burn by compression ignition in the combustion chamber 11, it is necessary to make the cylinder temperature rise to a temperature enabling self ignition of the premixed gas. It is necessary to make the cylinder temperature a higher temperature than when making all of the premixed gas burn by flame propagation in the combustion chamber 11 like in the SI operating mode. For this reason, in the present embodiment, for example, as shown in FIG. 4A and FIG. 4B, during the CI operating mode, the exhaust valve operating device 6 is controlled so that the exhaust valve 60 opens not only in the exhaust stroke, but also in the intake stroke. In this way, by performing the operation of opening the exhaust valve two times again opening the exhaust valve 60 during the intake stroke, it is possible to suck back the high temperature exhaust discharged from a cylinder during the exhaust stroke to the same cylinder during the immediately following intake stroke. Due to this, the cylinder temperature is made to rise and the cylinder temperature of the each cylinder 10 is maintained at a temperature enabling burning by compression ignition.

As shown in FIG. 4A, if opening the exhaust valve 60 when the lift of the intake valve 50 is small, a large amount of exhaust can be sucked back into the same cylinder, so the cylinder temperature can be made to greatly rise. On the other hand, as shown in FIG. 4B, if opening the exhaust valve 60 after the lift of the intake valve 50 becomes larger by a certain extent, the exhaust is sucked back after air (fresh air) is sucked into the cylinder by a certain degree, so the amount of exhaust sucked back into the same cylinder can be suppressed and the amount of rise of the cylinder temperature can be suppressed. In this way, it is possible to control the amount of rise of the cylinder temperature in accordance with the timing of performing a double opening operation of the exhaust valve. In the present disclosure, the ratio of the amount of EGR gas in the amount of cylinder gas and the amount of exhaust sucked back into the same cylinder will be called the "EGR rate".

Further, in burning the premixed gas in a combustion chamber 11 by compression ignition, if necessary, it is also possible to assist ignition of the premixed gas by the spark plug 16 to cause part of the premixed gas to burn by flame propagation and to use the heat generated at that time to make the cylinder temperature forcibly rise and thereby make the remaining premixed gas burn by compression ignition. By assisting ignition in this way and making the premixed gas burn by compression ignition, it becomes possible to make the premixed gas burn by compression ignition even in a state where the cylinder temperature is relatively low and becomes easy to control the ignition timing of the premixed gas to any timing.

In this regard, if making the premixed gas burn by compression ignition, the fuel dispersed inside the combustion chamber 11 self ignites at numerous points at the same timing. For this reason, there is the problem that the combustion noise D (dB) increases compared with the case of making the premixed gas burn by flame propagation.

Figure 5:
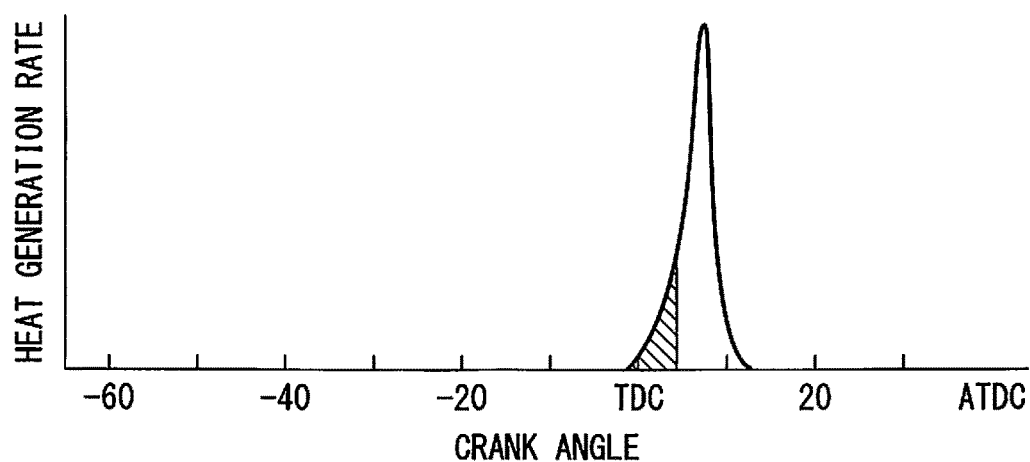
FIG. 5 is a view showing a relationship between a crank angle and heat generation rate when injecting fuel from a fuel injector just once to cause fuel to burn by compression ignition at any timing of a compression stroke.

FIG. 5 is a view showing the relationship between the crank angle and the heat generation rate when injecting fuel from the fuel injector 20 only one time at any timing during the compression stroke (in the example of FIG. 5, −50° ATDC (after top dead center)) to burn the fuel by compression ignition. The heat generation rate $(dQ/d\theta)$ (J/° CA) is the amount of heat per unit crank angle generated due to combustion of the premixed gas, that is, the amount of heat generation Q per unit crank angle. Note that in the following explanation, the combustion waveform showing the relationship of this crank angle and heat generation rate will be called the "heat generation rate pattern".

As explained above, when making the premixed gas burn by compression ignition, the fuel dispersed in the combustion chamber 11 self ignites at numerous points at the same timing, so the combustion speed becomes faster and the combustion period becomes shorter than when making fuel burn by flame propagation. For this reason, as shown in FIG. 5, when making the premixed gas burn by compression ignition, the peak value of the heat generation rate pattern and the slope $(d^2Q/(d\theta)^2)$ at the initial stage of combustion of the heat generation rate pattern (region shown by hatching in FIG. 5) tend to become relatively large.

The combustion noise D is correlated with the peak value and the slope at the initial stage of combustion of this heat generation rate pattern. The larger the peak value of the heat generation rate pattern and, further, the larger the slope at the initial stage of combustion, the greater it becomes. For this reason, when making the premixed gas burn by compression ignition, the combustion noise D increases compared with when burning the premixed gas by flame propagation.

Here, as the method of reducing the peak value and the slope in the initial stage of combustion of the heat generation rate pattern to decrease the combustion noise D, the method of injecting the fuel from a fuel injector 20 divided into several injections without changing the total fuel injection amount and making the fuel burn by compression ignition a plurality of times offset in time may be considered.

Figure 6:
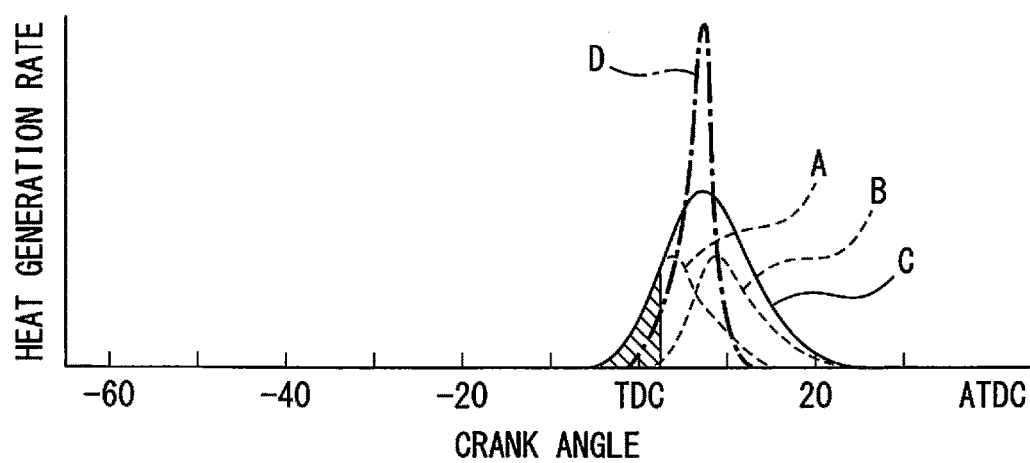
FIG. 6 is a view showing a relationship between a crank angle and heat generation rate when successively performing primary fuel injection and secondary fuel injection from a fuel injector to cause fuel to burn by compression ignition two times offset in time at any timing in a compression stroke.
Figure 7:
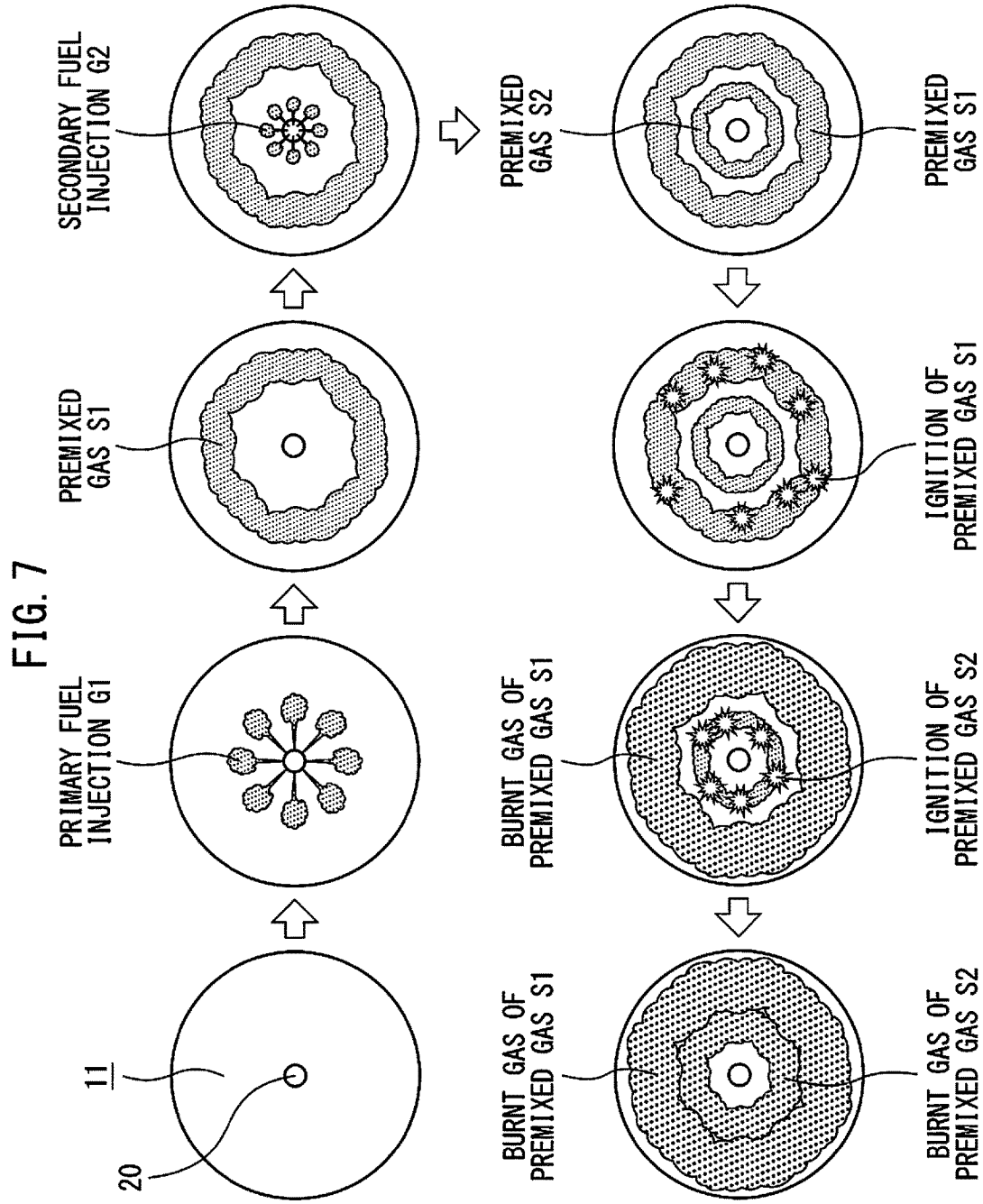
FIG. 7 is a view showing changes in a state inside a combustion chamber when successively performing primary fuel injection and secondary fuel injection from a fuel injector to cause fuel to burn by compression ignition two times offset in time at any timing in a compression stroke.

FIG. 6 is a view showing the relationship between the crank angle and heat generation rate when successively performing the primary fuel injection G1 and secondary fuel injection G2 from the fuel injector 20 and making the fuel burn by compression ignition two times offset in time without changing the total fuel injection amount at any timings during the compression stroke (in the example of FIG. 6, −50° ATDC and −30° ATDC). FIG. 7 is a view showing the changes in the state in the combustion chamber 11 in this case. Note that, in the example shown in FIG. 6 and FIG. 7, the mode of injecting fuel only one time each from the fuel injector as the primary fuel injection G1 and secondary fuel injection G2 was shown, but the mode of injecting fuel by dividing one or both of the primary fuel injection G1 and secondary fuel injection G2 into a plurality of injections with a short interval between them may also be considered.

In FIG. 6, the heat generation rate pattern A is the heat generation rate pattern when the premixed gas S1 formed by the primary fuel injection G1 (see FIG. 7) burns by compression ignition. The heat generation rate pattern B is the heat generation rate pattern when the premixed gas S2 formed by the secondary fuel injection G2 (see FIG. 7) burns by compression ignition. The heat generation rate pattern C is the actual heat generation rate pattern when combining the heat generation rate pattern A and the heat generation rate pattern B. The heat generation rate pattern D is the heat generation rate pattern of FIG. 5 shown for comparison.

As shown in FIG. 6, the peak values and slopes at the initial stages of combustion of the heat generation rate pattern A and heat generation rate pattern B become smaller than the peak value and slope at the initial stage of combustion of the heat generation rate pattern D. This is because the total fuel injection amount in the case of FIG. 5 is the same as the total fuel injection amount in the case of FIG. 6 (which is a total of the amount of primary fuel injected in the primary fuel injection G1 and the amount of secondary fuel injected in the secondary fuel injection G2), so compared with the amount of fuel contributing to the formation of the heat generation rate pattern D, the amount of fuel contributing to the formation of the heat generation rate pattern A (in this example, the amount of primary fuel injected in the primary fuel injection G1) and the amount of fuel contributing to the formation of the heat generation rate pattern B (in this example, the amount of secondary fuel injected in secondary fuel injection G2) become smaller and the amount of fuel ignited at the same timing is dispersed. As a result, as shown in FIG. 6, the peak value and slope at the initial stage of combustion of the actual combustion waveform of the heat generation rate pattern C (region shown by hatching in FIG. 6) also become smaller than the peak value and slope at the initial stage of combustion of the heat generation rate pattern D.

When in this way causing fuel to burn by compression ignition a plurality of times offset in time, the slope at the initial stage of combustion of the actual heat generation rate pattern C is dependent on the heat generation rate pattern of the fuel first made to burn by compression ignition (in this example, heat generation rate pattern A). Specifically, the smaller the slope at the initial stage of combustion of the heat generation rate pattern (in this example, heat generation rate pattern A) of the fuel first made to burn by compression ignition, the smaller the slope at the initial stage of combustion of the actual heat generation rate pattern C.

For this reason, to make the slope at the initial stage of combustion of the heat generation rate pattern smaller to more effectively suppress combustion noise D, it is effective to reduce the amount of the fuel first made to burn by compression ignition. In other words, it is effective to reduce the ratio of the amount of the fuel first made to burn by compression ignition in the total fuel injection amount. Therefore, if considered simply, for example, if successively performing the primary fuel injection G1 and secondary fuel injection G2 from a fuel injector 20, it may be sufficient to reduce the amount of primary fuel injected in the primary fuel injection G1 in a range enabling burning by compression ignition and reduce the amount of primary fuel injected in the primary fuel injection G1 in the total fuel injection amount.

Here, to form a stratified premixed gas such as shown in FIG. 7 in the combustion chamber 11 and burn it by compression ignition, the primary fuel injection G1 and secondary fuel injection G2 are successively performed at suitable timings and guide the fuel injected from the fuel injector 20 by the cavity 13 to form premixed gases S1, S2 in the combustion chamber 11 at desired timings before self ignition occurs.

At this time, if comparing the cylinder pressure P1 at the injection timing W1 of the primary fuel injection G1 and the cylinder pressure P2 at the injection timing W2 of the secondary fuel injection G2 performed after that, the cylinder pressure P2 becomes higher than the cylinder pressure P1. Further, the higher the engine load, the greater the amount of air taken into the combustion chamber 11, so even if successively performing the primary fuel injection G1 and secondary fuel injection G2 at the same timings at the engine high load side and engine low load side in the self ignition region RR, the cylinder pressure P1 and cylinder pressure P2 become higher at the engine high load side than the engine low load side.

Further, the cylinder pressure P1 at the injection timing W1 of the primary fuel injection G1 becomes higher at the engine high load side than the engine low load side, but becomes a relatively low pressure. For this reason, even if performing the primary fuel injection G1 at the same timings at the engine high load side and engine low load side in the self ignition region RR, not that much of a difference occurs in the spray penetration force of the fuel injected from the fuel injector and the time until the fuel injected from the fuel injector 20 reaches the cavity 13 does not change much at all. Therefore, regardless of the engine load, if performing the primary fuel injection G1 at a predetermined timing in the compression stroke determined by experiments in advance, it is possible to form the premixed gas S1 in the combustion chamber 11 at a desired timing before self ignition occurs.

On the other hand, the cylinder pressure P2 at the injection timing W2 of the secondary fuel injection G2 becomes a relatively high pressure. Furthermore, it becomes higher at the engine high load side than the engine low load side. For this reason, a difference arises in the spray penetration force of the fuel injected at the injection timing W2. The spray penetration force weakens since the higher the engine load, the higher the cylinder pressure P2. Therefore, if ending up performing the secondary fuel injection G2 at the same timings at the engine high load side and engine low load side in the self ignition region RR, at the engine high load side, the time until the fuel injected from the fuel injector 20 reaches the cavity 13 becomes longer, so the time required for forming the premixed gas S2 also becomes longer.

Since the time required for forming the premixed gas S2 becomes longer at the engine high load side in this way, if retarding the injection timing W2 of the secondary fuel injection G2 too much, the fuel cannot be made to disperse and premixed gas S2 ends up no longer being able to be formed at the desired timing before self ignition. Conversely, at the engine low load side, the time required for forming the premixed gas S2 becomes shorter, so if advancing the injection timing W2 of the secondary fuel injection G2 too much, the fuel ends up dispersing too much and premixed gas S2 ends up no longer being able to be formed at the desired timing before self ignition (in this case, resulting in a state where the premixed gas S1 and premixed gas S2 are mixed).

Therefore, the secondary fuel injection G2 is performed at a suitable timing in accordance with the engine load. Specifically, the injection timing W2 is made more advanced to the engine high load side in the self ignition region RR and more retarded to the engine low load side.

Further, the inventors engaged in intensive research and as a result learned that if retarding the injection timing W2 of the secondary fuel injection G2 in accordance with the engine load, sometimes the fuel injected by the secondary fuel injection G2 (below, referred to as the "secondary fuel") burns by compression ignition before the fuel injected by the primary fuel injection G1 (below, referred to as the "primary fuel"). In this case, if ending up making the ratio of the amount of primary fuel injected in the primary fuel injection G1 in the total fuel injection amount smaller, the ratio of the amount of secondary fuel injected in the secondary fuel injection G2 in the total fuel injection amount ends up becoming larger by that amount. For this reason, conversely the slope at the initial stage of combustion of the heat generation rate pattern ends up becoming larger and the combustion noise D ends up becoming larger. Therefore, in this case, to reduce the slope at the initial stage of combustion of the heat generation rate pattern to suppress combustion noise D, the amount of secondary fuel injected in the secondary fuel injection G2 in the total fuel injection amount is reduced.

Below, the reasons considered to cause such a phenomenon to occur will be explained.

When making the premixed gas burn by compression ignition, the fuel injected into the combustion chamber 11 undergoes various chemical reactions in stages along with the rise of the cylinder temperature T (K) and cylinder pressure P (MPa) leading to self ignition. At that time, clear heat generation occurs such as shown in FIG. 5 and FIG. 6. For this reason, the time $\tau$ (sec) until the fuel injected into the combustion chamber 11 self ignites (below, referred to as the "ignition delay time") is governed by the speed of progression of the chemical reactions of the fuel from when fuel is injected into the combustion chamber 11. Further, the speed of progression of the chemical reactions of the fuel changes due to the equivalent ratio φ etc. in addition to the cylinder temperature T and cylinder pressure P.

Therefore, in other words, the ignition delay time τ changes depending on the cylinder temperature T, cylinder pressure P, equivalent ratio φ, etc. Specifically, the ignition delay time τ basically tends to become shorter the higher the cylinder temperature T, become shorter the higher the cylinder pressure P, and become shorter the larger the equivalent ratio φ.

In this way, the ignition delay time τ basically becomes shorter the higher the cylinder temperature T, but in the chemical reactions of the fuel, the progression of the chemical reactions of the fuel slows in a predetermined temperature region before the fuel self ignites and clear heat generation appears. As a result, when the cylinder temperature T is in this temperature region, compared with when the cylinder temperature T is outside this temperature region, the ratio of change of the ignition delay time τ with respect to the cylinder temperature T differs.

Figure 8:
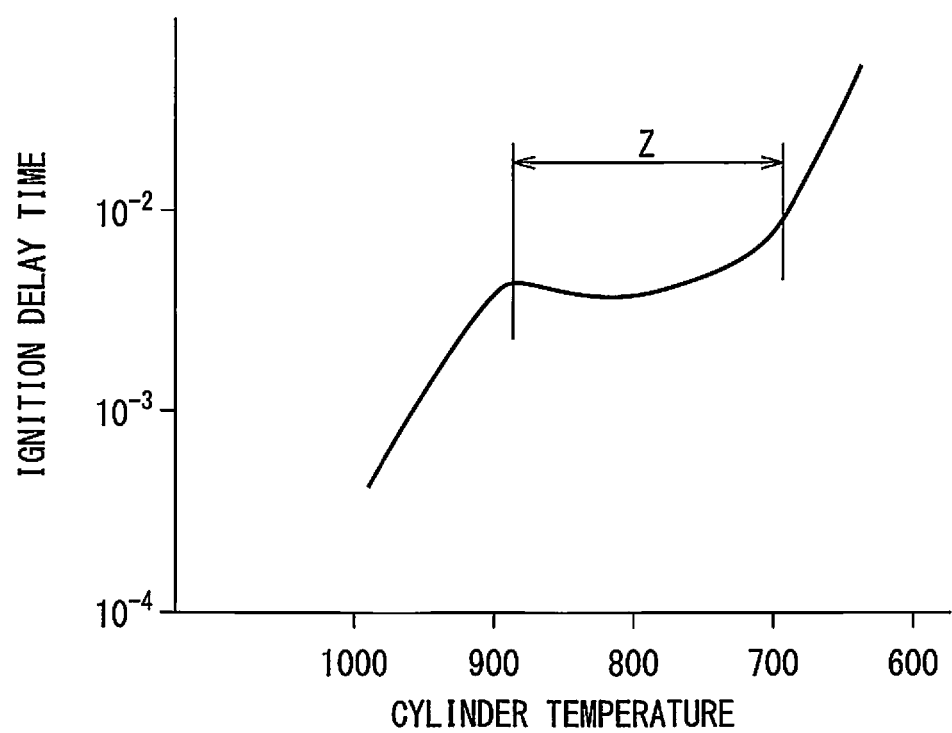
FIG. 8 is a view showing changes in a representative ignition delay time $\tau$ in an internal combustion engine in which a cylinder temperature and cylinder pressure rise along with a rise of a piston.

FIG. 8 is a view showing the change of the representative ignition delay time τ in an internal combustion engine where the cylinder temperature T and cylinder pressure P rise along with a rise in a piston.

The temperature region Z shown in FIG. 8 is a region in which progression of the chemical reactions of the fuel slows. If the cylinder temperature T is in the temperature region Z, the ratio of change of the ignition delay time τ with respect to the amount of rise of the cylinder temperature T becomes smaller than when the cylinder temperature T is out of the temperature region Z. Further, this temperature region Z fluctuates somewhat depending on the fuel properties, but as shown in FIG. 8, in an internal combustion engine using gasoline as fuel, it generally becomes about 700K to about 900K.

Figure 9:
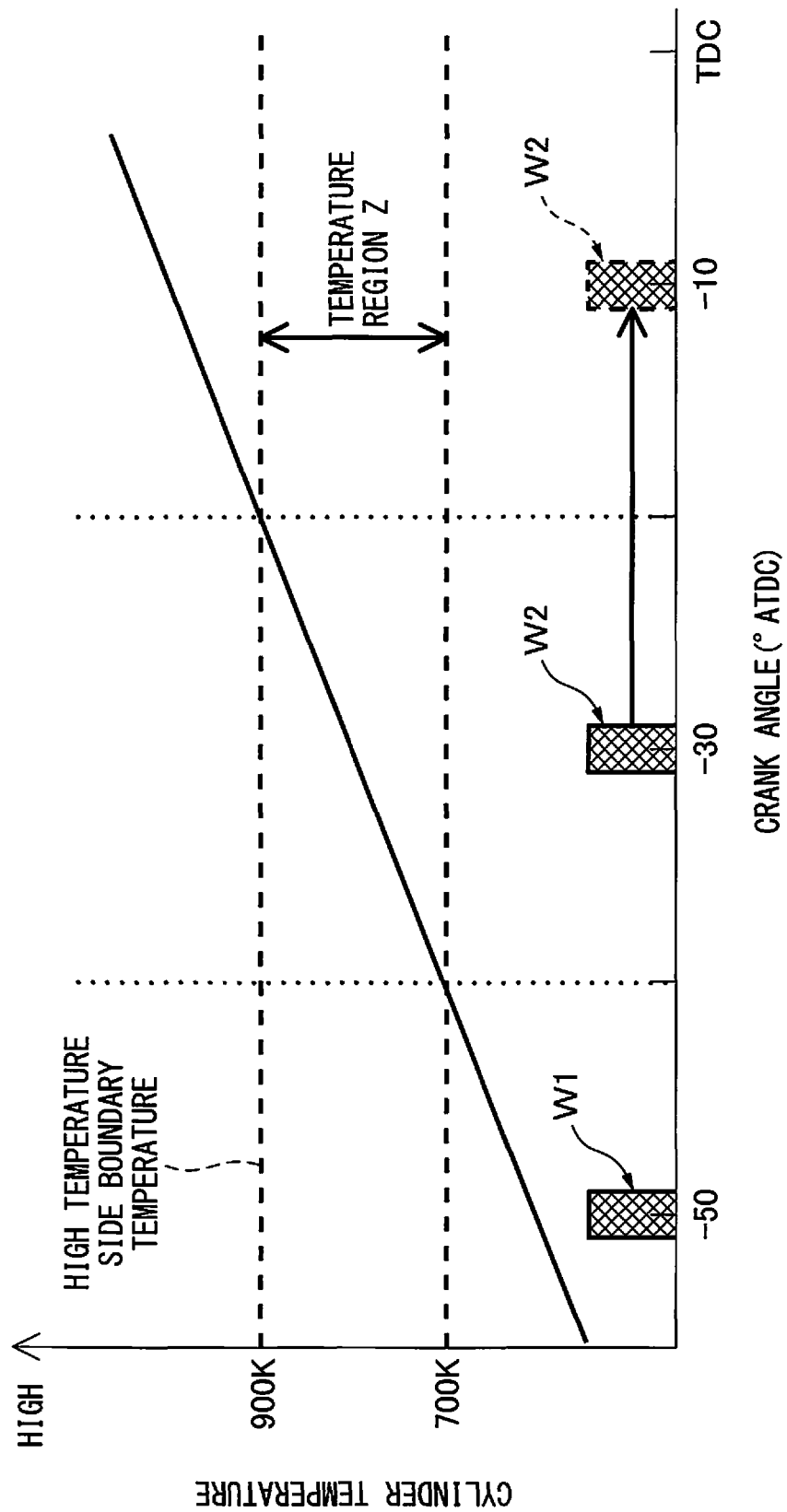
FIG. 9 is a view showing an example of a relationship of a crank angle and cylinder temperature during a CI operating mode.

FIG. 9 is a view showing one example of the relationship between the crank angle and the cylinder temperature in the CI operating mode. If successively performing the primary fuel injection G1 and secondary fuel injection G2 to form a stratified premixed gas such as shown in FIG. 7 in the combustion chamber 11 and burn it by compression ignition, as shown in FIG. 9, the injection timing W1 of the primary fuel injection G1 becomes basically the timing before the cylinder temperature T reaches the temperature region Z.

On the other hand, the injection timing W2 of the secondary fuel injection G2 becomes a timing when the cylinder temperature T is in the temperature region Z at the high load side in the self ignition region RR, but if retarding the injection timing W2 of the secondary fuel injection G2 as the engine load becomes lower, it sometimes becomes a timing when the cylinder temperature T is in the temperature region at the high temperature side from the temperature region Z.

If the secondary fuel injection G2 is performed when the cylinder temperature T is in the temperature region Z, the progression of the chemical reactions of the secondary fuel slows until the cylinder temperature T becomes higher than the high temperature side boundary temperature of the temperature region Z (in an example embodiment, 900K). For this reason, it is possible to make the secondary fuel disperse until the cylinder temperature T becomes the high temperature side boundary temperature of the temperature region Z. Therefore, around when the cylinder temperature T becomes a temperature higher than the high temperature side boundary temperature of the temperature region Z and the chemical reactions of the secondary fuel progress, a premixed gas S2 of a suitable equivalent ratio φ is formed inside the combustion chamber 11.

On the other hand, if secondary fuel injection G2 were performed when the cylinder temperature T becomes a temperature higher than the high temperature side boundary temperature of the temperature region Z, the chemical reactions of the secondary fuel rapidly would proceed starting right after performing the secondary fuel injection G2. Further, right after performing the secondary fuel injection G2, premixed gas of the extremely large equivalent ratio φ before dispersion of the secondary fuel (that is, before premixed gas S2 of a suitable equivalent ratio φ is formed) would be formed inside the combustion chamber 11. For this reason, compared with performing secondary fuel injection G2 when the cylinder temperature T is in the temperature region Z, the ignition delay time τ would become extremely short and secondary fuel might end up burning by compression ignition before the primary fuel.

Therefore, in the present embodiment, the ratio of the secondary fuel in the total fuel injection amount (i.e., the ratio of the amount of the secondary fuel in the total fuel injection amount) is made lower when the secondary fuel being injected at a crank angle at which the cylinder temperature would become the high temperature side from the temperature region Z would cause the self ignition timing of the secondary fuel to become earlier than the self ignition timing of the primary fuel injected at a predetermined crank angle compared with when the secondary fuel being injected at a crank angle at which the cylinder temperature would become inside the temperature region Z would cause the self ignition timing of the secondary fuel to become later than the self ignition timing of the primary fuel injected at a predetermined crank angle.

Due to this, even when the secondary fuel first burns by compression ignition before the primary fuel, it is possible to reduce the slope at the initial stage of combustion of the heat generation rate pattern, so it is possible to suppress combustion noise D.

Figure 10:
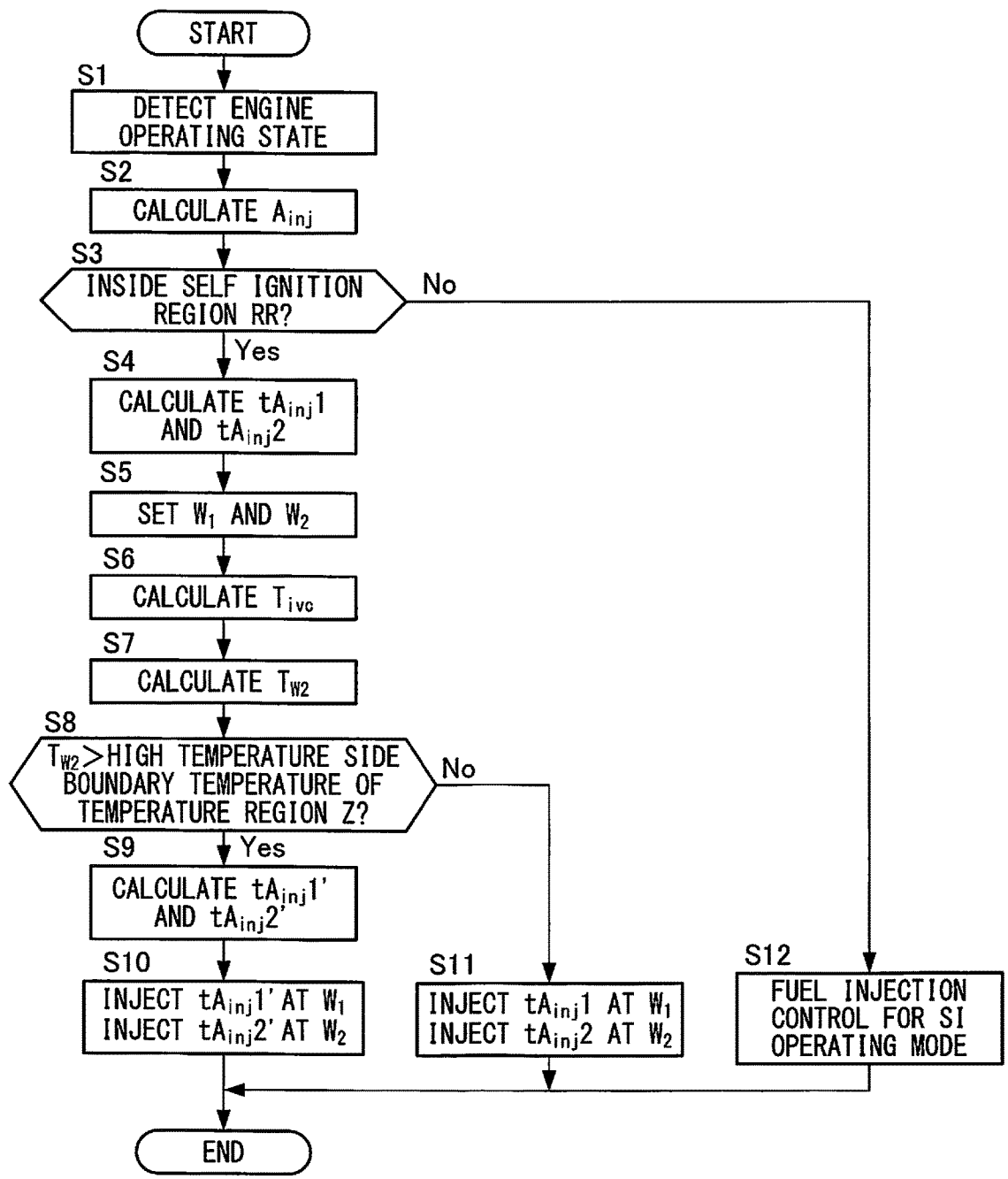
FIG. 10 is a flow chart explaining fuel injection control in a first embodiment of the present disclosure.

FIG. 10 is a flow chart explaining the fuel injection control according to the present embodiment. The electronic control unit 200 repeatedly performs this routine at a predetermined processing period (for example, 10 ms) during engine operation.

At step S1, the electronic control unit 200 reads the engine rotational speed calculated based on the output signal of the crank angle sensor 218 and the engine load detected by the load sensor 217 and detects the engine operating state.

Figure 11:
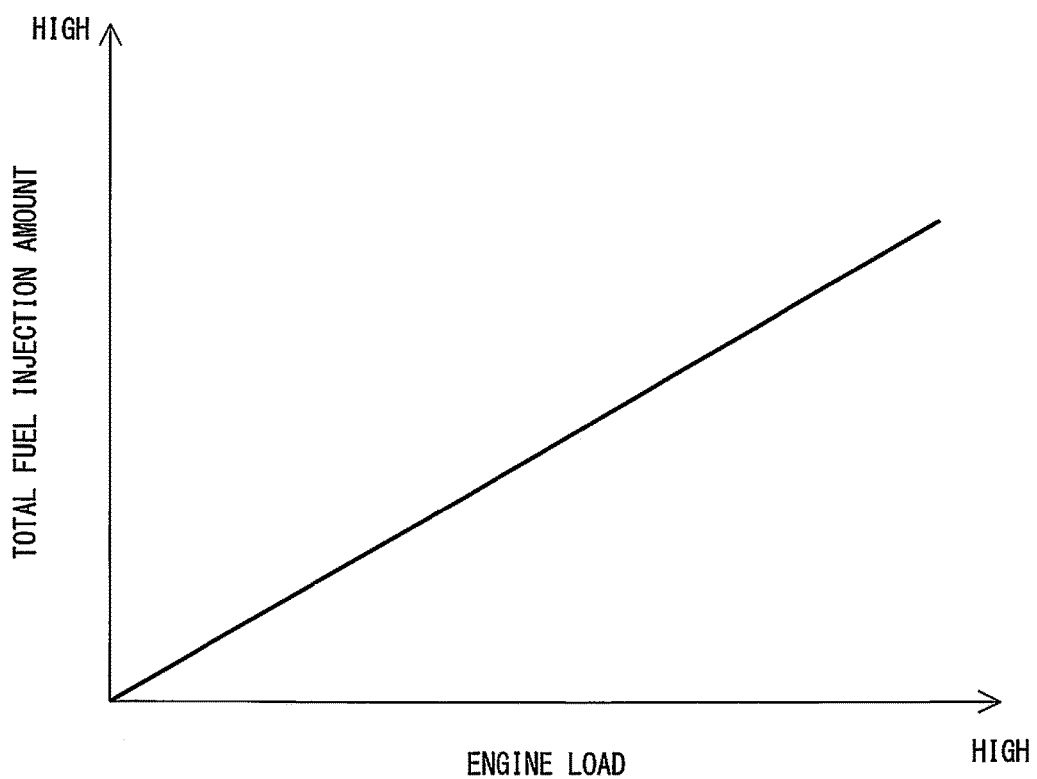
FIG. 11 is a graph for calculating a total fuel injection amount $A_{inj}$ based on an engine load.

At step S2, the electronic control unit 200 refers to the graph shown in FIG. 11 (which is, for example, prepared/determined in advance by experiments) and calculates the total fuel injection amount $A_{inj}$ based on the engine load. As shown in FIG. 11, the total fuel injection amount $A_{inj}$ becomes greater the higher the engine load.

At step S3, the electronic control unit 200 judges whether the engine operating state is in the self ignition region RR. The electronic control unit 200 proceeds to the processing of step S4 for performing fuel injection control corresponding to the CI operating mode if the engine operating state is in the self ignition region RR (which is, for example, prepared/determined in advance by experiments). On the other hand, the electronic control unit 200 proceeds to the processing of step S12 for performing fuel injection control corresponding to the SI operating mode if the engine operating state is outside the self ignition region RR.

At step S4, the electronic control unit 200 divides the total fuel injection amount $A_{inj}$ by a preset basic division rate (which is, for example, prepared/determined in advance by experiments) to calculate the basic target injection amount $tA_{inj}1$ of the primary fuel injection G1 and the basic target injection amount $tA_{inj}2$ of the secondary fuel injection G2. The basic division rate is a division rate set assuming the primary fuel will burn by compression ignition first. Therefore, by the basic division rate, the amount of the secondary fuel of the secondary fuel injection G2 becomes higher than the amount of the primary fuel of the primary fuel injection G1 so as to enable reduction of the slope at the initial stage of combustion of the heat generation rate pattern when the primary fuel first burns by compression ignition. That is, the ratio of the secondary fuel in the total fuel injection amount $A_{inj}$ becomes higher than the ratio of the primary fuel in the total fuel injection amount $A_{inj}$ (i.e., the ratio of the amount of the primary fuel in the total fuel injection amount).

Figure 12:
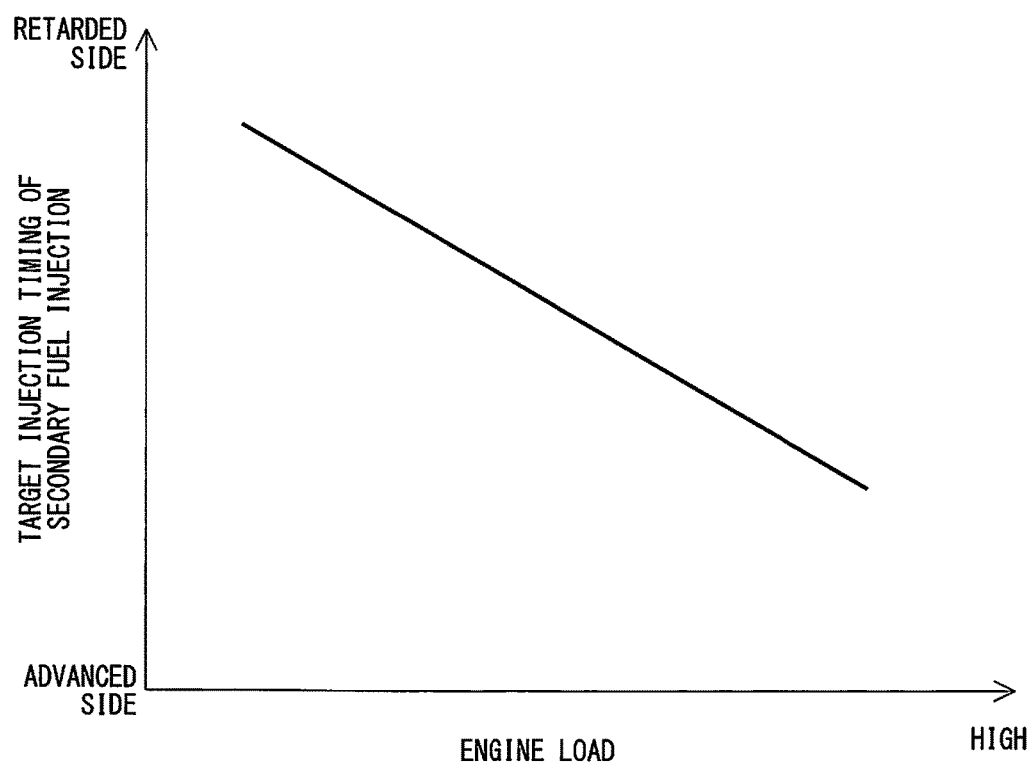
FIG. 12 is a graph for setting an injection timing W2 of secondary fuel injection based on an engine load.

At step S5, the electronic control unit 200 sets the injection timing W1 of the primary fuel injection G1 and the injection timing W2 of the secondary fuel injection G2. In the present embodiment, the electronic control unit 200 sets a predetermined timing in the compression stroke (for example, −50° ATDC) as the injection timing W1 of the primary fuel injection G1. Further, the electronic control unit 200 refers to the graph shown in FIG. 12 (which is, for example, prepared/determined in advance by experiments) and sets the injection timing W2 of the secondary fuel injection G2 based on the engine load. As shown in FIG. 11, the injection timing W2 of the secondary fuel injection G2 is set more to the retarded side the lower the engine load.

Figure 13:
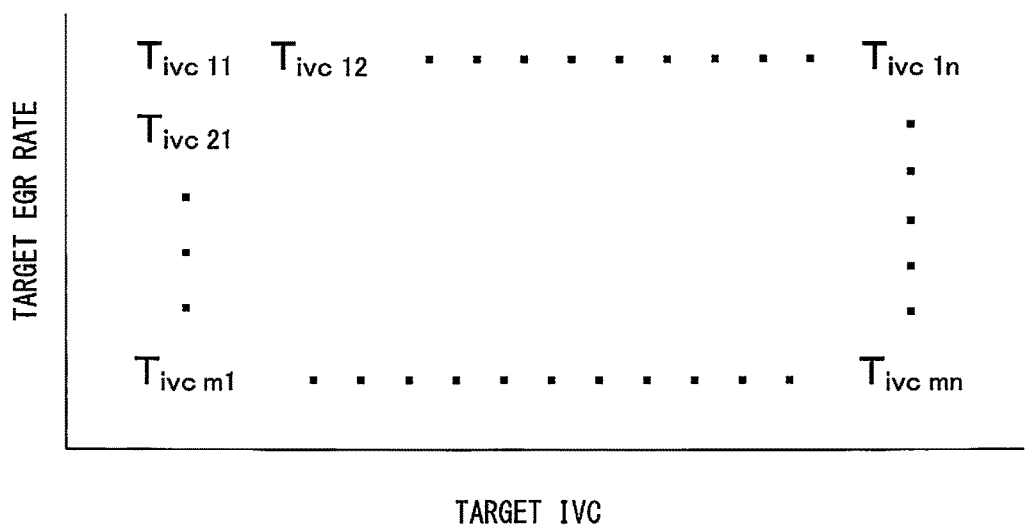
FIG. 13 is a map for calculating an initial cylinder temperature $T_{ivc}$ based on a target IVC and a target EGR rate.

At step S6, the electronic control unit 200 calculates the initial cylinder temperature $T_{ivc}$ at the target closing timing of the intake valve (below, referred to as the "target IVC"). In the present embodiment, the electronic control unit 200 reads the target IVC and target EGR rate separately set in accordance with the engine operating state and refers to the map of FIG. 13 (which is, for example, prepared/determined in advance by experiments) linking these with the initial cylinder temperature $T_{ivc}$ to thereby calculate the initial cylinder temperature $T_{ivc}$ based on the target IVC and target EGR rate.

At step S7, the electronic control unit 200 calculates the estimated cylinder temperature $T_{W2}$ at the injection timing W2 of the secondary fuel injection G2. In the present embodiment, the estimated cylinder temperature $T_{W2}$ is calculated based on the initial cylinder temperature $T_{ivc}$ from the following formula (1) for estimation of the cylinder temperature T in the case of adiabatic compression of the air-fuel mixture:

$$T_{W2} = T_{ivc} \times (V_{ivc}/V_{W2})^{k-1} \quad (1)$$

In the formula (1), $V_{ivc}$ is the combustion chamber volume at the target IVC, $V_{W2}$ is the combustion chamber volume at the injection timing W2 of the secondary fuel injection G2, and k is the specific heat ratio (polytropic index). The combustion chamber volume $V_{ivc}$ is a value determined mechanically if the target IVC is determined. Further, similarly, the combustion chamber volume $V_{W2}$ is also a value determined mechanically if the injection timing W2 of the secondary fuel injection G2 is determined. Therefore, in the present embodiment, in calculating the estimated cylinder temperature $T_{W2}$, a graph linking the target IVC and the combustion chamber volume $V_{ivc}$ is prepared in advance by experiments etc. and that graph is referred to so as to calculate the combustion chamber volume $V_{ivc}$ based on the target IVC. Further, similarly, a graph linking the injection timing W2 of the secondary fuel injection G2 and the combustion chamber volume $V_{W2}$ is prepared in advance by experiments etc. and that graph is referred to as so as to calculate the combustion chamber volume $V_{W2}$ based on the injection timing W2 of the secondary fuel injection G2.

At step S8, the electronic control unit 200 judges if the estimated cylinder temperature $T_{W2}$ is higher than the high temperature side boundary temperature of the temperature region Z (which is, for example, prepared/determined in advance by experiments). In an example embodiment, the high temperature side boundary temperature of the temperature region Z is set to 900K. The electronic control unit 200 proceeds to the processing of step S9 if the estimated cylinder temperature $T_{W2}$ becomes higher than the high temperature side boundary temperature of the temperature region Z. On the other hand, the electronic control unit 200 proceeds to the processing of step S11 if the estimated cylinder temperature $T_{W2}$ is the high temperature side boundary temperature of the temperature region Z or less.

At step S9, the electronic control unit 200 calculates the corrected target injection amount $tA_{inj}1'$ of the primary fuel injection G1 and the corrected target injection amount $tA_{inj}2'$ of the secondary fuel injection G2 so that the ratio of the secondary fuel in the total fuel injection amount $A_{inj}$ becomes lower than the ratio of the primary fuel. In the present embodiment, the electronic control unit 200 performs correction to decrease the basic target injection amount $tA_{inj}2$ of the secondary fuel injection G2 to calculate the corrected target injection amount $tA_{inj}2'$ of the secondary fuel injection G2. Further, the electronic control unit 200 performs correction to add the amount of decrease from the basic target injection amount $tA_{inj}2$ of the secondary fuel injection G2 to the basic target injection amount $tA_{inj}1$ of the primary fuel injection G1 to calculate the corrected target injection amount $tA_{inj}1'$ of the primary fuel injection G1, without changing the total fuel injection amount $A_{inj}$).

In this way, the electronic control unit 200 sets the ratio of the secondary fuel in the total fuel injection amount so that the ratio of the secondary fuel in the total fuel injection amount becomes lower when the cylinder temperature $T_{W2}$ is higher than the high temperature side boundary temperature of the temperature region Z compared to when it is lower. Due to this, when secondary fuel first burns by compression ignition, it is possible to make the ratio of the secondary fuel in the total fuel injection amount lower than when the primary fuel first burns by compression ignition. For this reason, it is possible to make the slope at the initial stage of combustion of the heat generation rate pattern smaller to suppress combustion noise D.

Further, at this time, by setting the ratio of the secondary fuel in the total fuel injection amount $A_{inj}$ so that the ratio of the secondary fuel in the total fuel injection amount $A_{inj}$ becomes lower than the ratio of the primary fuel (so that the amount of secondary fuel injected in the secondary fuel injection G2 becomes smaller than the amount of primary fuel injected in the primary fuel injection G1) like in the present embodiment, it is possible to make the slope at the initial stage of combustion of the heat generation rate pattern smaller and effectively suppress the combustion noise D.

At step S10, the electronic control unit 200 controls the fuel injector 20 to inject the corrected target injection amount $tA_{inj}1'$ at the target injection timing W1 of the primary fuel injection G1 and inject the corrected target injection amount $tA_{inj}2'$ at the target injection timing W2 of the secondary fuel injection G2.

At step S11, the electronic control unit 200 controls the fuel injector 20 to inject the basic target injection amount $tA_{inj}1$ at the injection timing W1 of the primary fuel injection G1 and to inject the basic target injection amount $tA_{inj}2$ at the injection timing W2 of the secondary fuel injection G2.

At step S12, the electronic control unit 200 performs fuel injection control for the SI operating mode. Specifically, the electronic control unit 200 injects fuel of the total fuel injection amount from the fuel injector 20 at any timing from the intake stroke to the compression stroke where a premixed gas for burning by flame propagation can be formed.

According to the present embodiment explained above, there is provided an electronic control unit 200 (control system) programmed, or otherwise configured, e.g., by hardware circuitry, to control an internal combustion engine 100 provided with a fuel injector 20 configured to inject fuel into a cylinder 10 of an engine body 1 and having a temperature region Z in which a change of ignition delay time accompanying a rise in cylinder temperature during chemical reactions of fuel is suppressed in a compression stroke in a cycle where premixed gas is made to burn in a cylinder 10 by compression ignition. The electronic control unit 200 comprises a fuel injection control part (e.g., CPU 204) configured to successively inject primary fuel and secondary fuel from a fuel injector 20 such that the premixed gas burns by compression ignition in the cylinder 10.

Further, the fuel injection control part is configured to lower the ratio of the secondary fuel in the total fuel injection amount $A_{inj}$ when the secondary fuel being injected at a crank angle at which the cylinder temperature T would become the high temperature side from the temperature region Z would cause the self ignition timing of the secondary fuel to become earlier than the self ignition timing of the primary fuel injected at a predetermined crank angle compared with when the secondary fuel being injected at a crank angle at which the cylinder temperature T would become inside the temperature region Z would cause the self ignition timing of the secondary fuel to become later than the self ignition timing of the primary fuel injected at a predetermined crank angle.

Specifically, the fuel injection control part comprises a total fuel injection amount calculating part (e.g., CPU 204) configured to calculate a total fuel injection amount $A_{inj}$ based on the engine load, an injection timing setting part (e.g., CPU 204) configured to set an injection timing W2 of secondary fuel such that the injection timing W2 of the secondary fuel becomes delayed when the engine load is low compared with when it is high, an estimated cylinder temperature calculating part (e.g., CPU 204) configured to calculate an estimated cylinder temperature $T_{W2}$ at an injection timing W2 of secondary fuel set by the injection timing setting part, and a fuel ratio setting part (e.g., CPU 204) configured to set a ratio of the secondary fuel in the total fuel injection amount $A_{inj}$ such that the ratio of the secondary fuel in the total fuel injection amount $A_{inj}$ becomes lower when the estimated cylinder temperature $T_{W2}$ is higher than the boundary temperature of the high temperature side (i.e., an upper boundary temperature) of the temperature region Z compared to when it is lower.

Due to this, the ratio of the secondary fuel in the total fuel injection amount $A_{inj}$ can be made lower when the secondary fuel first burns by compression ignition than when the primary fuel first burns by compression ignition. For this reason, it is possible to make the slope of the heat generation rate pattern at the initial stage of combustion smaller and suppress combustion noise D even when the secondary fuel first burns by compression ignition.

In particular, in the present embodiment, the fuel ratio setting part is configured so as to set the ratio of the secondary fuel in the total fuel injection amount $A_{inj}$ so that the ratio of the secondary fuel in the total fuel injection amount $A_{inj}$ becomes lower than the ratio of the primary fuel when the estimated cylinder temperature $T_{W2}$ is higher than the high temperature side boundary temperature of the temperature region Z. For this reason, when the secondary fuel first burns by compression ignition, it is possible to make the slope of the heat generation rate pattern at the initial stage of combustion smaller and effectively suppress the combustion noise D.

Further, in the present embodiment, the fuel ratio setting part is configured to set the ratio of the secondary fuel in the total fuel injection amount $A_{inj}$ so that the ratio of the secondary fuel in the total fuel injection amount $A_{inj}$ becomes higher than the ratio of the primary fuel when the estimated cylinder temperature $T_{W2}$ is the high temperature side boundary temperature of the temperature region Z or less. For this reason, when the primary fuel first burns by compression ignition, it is possible to make the slope of the heat generation rate pattern at the initial stage of combustion smaller and effectively suppress the combustion noise D.

Second Embodiment

Next, fuel injection control according to a second embodiment of the present disclosure will be explained. The fuel injection control according to the present embodiment differs from the first embodiment on the point of setting the ratio of the secondary fuel in the total fuel injection amount $A_{inj}$ considering the time when the cylinder temperature T becomes higher than the temperature region Z. Below, this point of difference will mainly be explained.

In the above-mentioned first embodiment, the ratio of the secondary fuel in the total fuel injection amount $A_{inj}$ was set so that the ratio of the secondary fuel in the total fuel injection amount $A_{inj}$ became lower when the estimated cylinder temperature $T_{W2}$ was higher than the high temperature side boundary temperature of the temperature region Z compared to when it was lower.

However, for example, when the target IVC is made advanced or retarded from intake bottom dead center and the actual compression ratio falls, when the EGR rate becomes lower, or otherwise when the initial cylinder temperature $T_{ivc}$ becomes relatively low, the crank angle at which the cylinder temperature T becomes the high temperature side boundary temperature of the temperature region Z sometimes is retarded until near compression top dead center. In this case, after compression top dead center, the cylinder temperature T falls, so the time when the cylinder temperature T becomes higher than the high temperature side boundary temperature of the temperature region Z becomes an extremely short time around compression top dead center. Therefore, when the cylinder temperature T becomes higher than the high temperature side boundary temperature of the temperature region Z, the ignition delay time τ of the secondary fuel when the secondary fuel injection G2 is being performed becomes longer the shorter the time during which the cylinder temperature T becomes higher than the high temperature side boundary temperature of the temperature region Z after performing the secondary fuel injection G2.

For this reason, if the time during which the cylinder temperature T becomes higher than the high temperature side boundary temperature of the temperature region Z is shorter than a certain constant time, even if the secondary fuel injection G2 were performed when the cylinder temperature T became higher than the high temperature side boundary temperature of the temperature region Z, sometimes the fuel injected by the primary fuel injection G1 would first burn by compression ignition.

Therefore, in the present embodiment, when the time during which the cylinder temperature T becomes higher than the high temperature side boundary temperature of the temperature region Z becomes shorter than a predetermined time, even if the estimated cylinder temperature $T_{W2}$ of the injection timing W2 of the secondary fuel injection G2 becomes higher than the high temperature side boundary temperature of the temperature region Z, the basic target injection amount $tA_{inj}1$ is injected at the injection timing W1 of the primary fuel injection G1 and the basic target injection amount $tA_{inj}2$ is injected at the injection timing W2 of the secondary fuel injection G2 as usual. Below, the fuel injection control according to the present embodiment will be explained.

Figure 14:
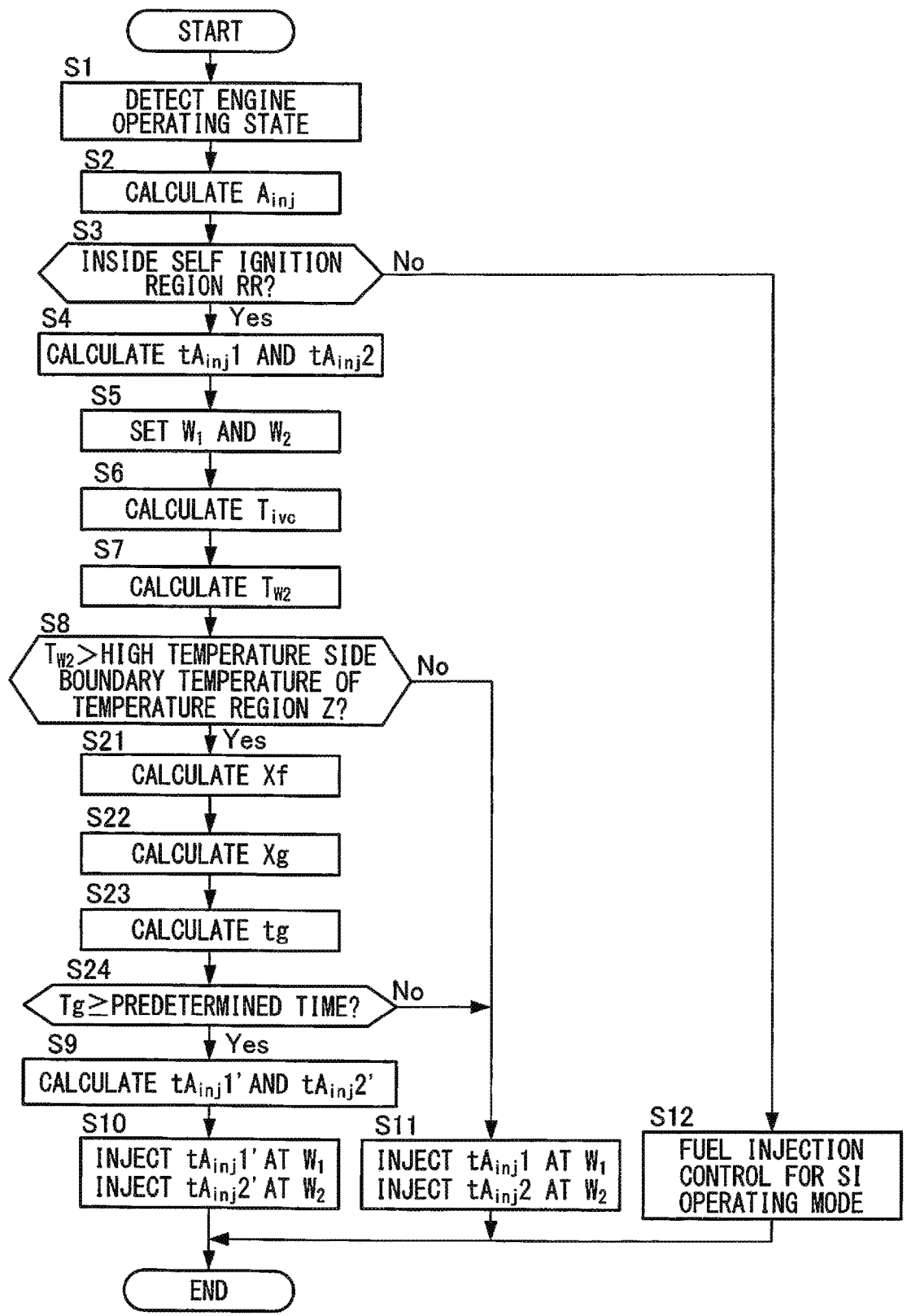
FIG. 14 is a flow chart explaining fuel injection control in a second embodiment of the present disclosure.

FIG. 14 is a flow chart explaining the fuel injection control according to the present embodiment performed for each cylinder. The electronic control unit 200 repeatedly performs this routine at a predetermined processing period (for example, 10 ms) during engine operation.

The processing from step S1 to step S12 is similar to the first embodiment, so the explanation will be omitted here.

Figure 15:
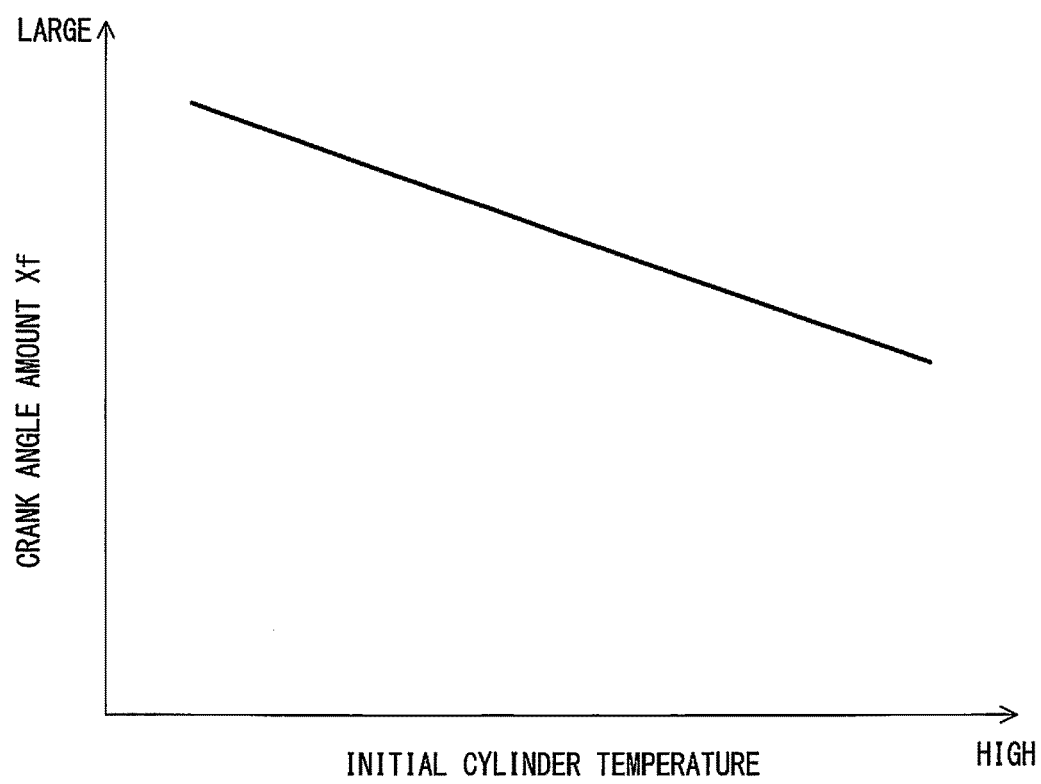
FIG. 15 is a graph for calculating a crank angle amount Xf based on an initial cylinder temperature $T_{ivc}$.

At step S21, the electronic control unit 200 refers to the graph of FIG. 15 prepared in advance by experiments etc. and calculates the crank angle amount Xf required for the cylinder temperature T to rise from the initial cylinder temperature $T_{ivc}$ to the high temperature side boundary temperature of the temperature region Z (in the present embodiment, 900K) based on the initial cylinder temperature $T_{ivc}$. As shown in FIG. 15, the higher the initial cylinder temperature $T_{ivc}$, the smaller the crank angle amount Xf becomes.

At step S22, the electronic control unit 200 calculates the crank angle amount Xg from the crank angle at which the cylinder temperature T becomes the high temperature side boundary temperature of the temperature region Z to the crank angle corresponding to compression top dead center. Specifically, the electronic control unit 200 adds the crank angle amount Xf to the crank angle corresponding to the target IVC to calculate the crank angle at which the cylinder temperature T becomes the high temperature side boundary temperature of the temperature region Z. Further, it subtracts the crank angle at which the cylinder temperature T becomes the high temperature side boundary temperature of the temperature region Z from the crank angle corresponding to top dead center of the compression stroke to calculate the crank angle amount Xg.

At step S23, the electronic control unit 200 calculates the time required for the piston 12 to move by exactly the crank angle amount Xg, that is, the time tg (sec) required for the cylinder temperature T to become higher than the high temperature side boundary temperature of the temperature region Z during the compression stroke (below, referred to as "high temperature time"). Specifically, the electronic control unit 200 calculates the high temperature time tg from the following formula (2) based on the crank angle amount Xg and the engine speed N:

$$tg = Xg \times (60/N) \times (1/360) \qquad (2)$$

At step S24, the electronic control unit 200 judges if the high temperature time tg is a predetermined time or more (the predetermined time is, for example, prepared/determined in advance by experiments). If the high temperature time tg is the predetermined time or more, the electronic control unit 200 proceeds to the processing of step S9. On the other hand, if the high temperature time tg is less than a predetermined time, the electronic control unit 200 proceeds to the processing of step S11.

Note that, the cylinder temperature T basically rises and falls in sharp contrast at top dead center of the compression stroke, so the time when the cylinder temperature T actually becomes higher than the high temperature side boundary temperature of the temperature region Z becomes the time of about two times the high temperature time tg calculated at step S23. For this reason, at step S24, it is also possible to compare the value of the high temperature time tg calculated at step S23 multiplied by 2 and the predetermined time (in this case, the predetermined time may also be multiplied by 2).

According to the present embodiment explained above, the fuel injection control part of the electronic control unit 200 comprises not only the total fuel injection amount calculating part, injection timing setting part, estimated cylinder temperature calculating part, and fuel ratio setting part but also a high temperature time calculating part (e.g., CPU 204) configured to calculate a high temperature time tg when the cylinder temperature T becomes higher than the high temperature side boundary temperature of the temperature region Z during the compression stroke. Further, the fuel ratio setting part is configured so as to set the ratio of the secondary fuel in the total fuel injection amount $A_{inj}$ so that the ratio of the secondary fuel in the total fuel injection amount $A_{inj}$ becomes higher than the ratio of the primary fuel regardless of whether the estimated cylinder temperature $T_{W2}$ is higher than the high temperature side boundary temperature of the temperature region Z when the high temperature time tg is the predetermined time or more.

Due to this, by retarding the crank angle at which the cylinder temperature T becomes the high temperature side boundary temperature of the temperature region Z until near compression top dead center, it is possible to lower the ratio of primary fuel in the total fuel injection amount below the ratio of the secondary fuel when even if secondary fuel injection G2 is performed when the cylinder temperature T becomes higher than the high temperature side boundary temperature of the temperature region Z, the fuel injected by the primary fuel injection G1 would first burn by compression ignition. For this reason, it is possible to reduce the slope at the initial stage of combustion of the heat generation rate pattern to effectively suppress combustion noise D.

Third Embodiment

Next, fuel injection control according to a third embodiment of the present disclosure will be explained. The fuel injection control according to this embodiment differs from the first embodiment and the second embodiment on the point of setting the ratio of the secondary fuel in the total fuel injection amount $A_{inj}$ considering the time when the cylinder temperature T becomes higher than the high temperature side boundary temperature of the temperature region Z after the secondary fuel injection G2. Below, this point of difference will mainly be explained.

In the above way, when the cylinder temperature T becomes a higher temperature than the high temperature side boundary temperature of the temperature region Z, the ignition delay time τ of the secondary fuel when the secondary fuel injection G2 is performed becomes longer the shorter the time when the cylinder temperature T becomes a higher temperature than the high temperature side boundary temperature of the temperature region Z after the secondary fuel injection G2.

For this reason, in the above-mentioned second embodiment, the ratio of the secondary fuel in the total fuel injection amount $A_{inj}$ was set considering simply the time the cylinder temperature T became higher than the high temperature side boundary temperature of the temperature region Z.

As opposed to this, in the present embodiment, more strictly, the ratio of the secondary fuel in the total fuel injection amount $A_{inj}$ was set considering the time the cylinder temperature T became higher than the high temperature side boundary temperature of the temperature region Z after the secondary fuel injection G2. Specifically, when the time from the injection timing W2 of the secondary fuel injection G2 to when the piston reaches compression top dead center when the estimated cylinder temperature $T_{W2}$ becomes higher than the high temperature side boundary temperature of the temperature region Z becomes shorter than a predetermined time, even if the estimated cylinder temperature $T_{W2}$ of the injection timing W2 of the secondary fuel injection G2 becomes higher than the high temperature side boundary temperature of the temperature region Z, the basic target injection amount $tA_{inj}1$ is injected at the injection timing W1 of the primary fuel injection G1 and the basic target injection amount $tA_{inj}2$ is injected at the injection timing W2 of the secondary fuel injection G2 as usual. Below, the fuel injection control according to the present embodiment will be explained.

Figure 16:
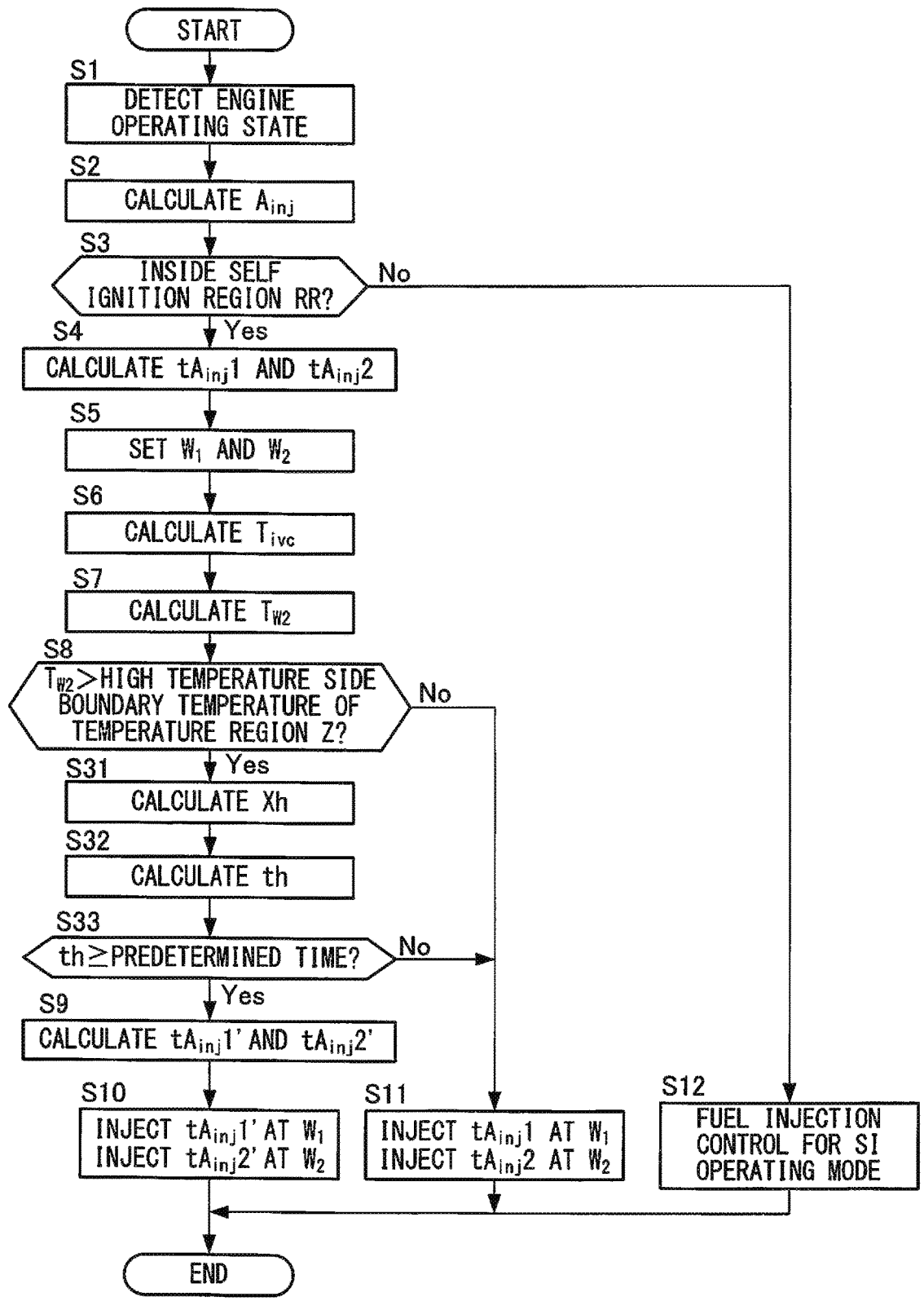
FIG. 16 is a flow chart explaining fuel injection control in a third embodiment of the present disclosure.

FIG. 16 is a flow chart explaining the fuel injection control according to the present embodiment performed for each cylinder. The electronic control unit 200 repeatedly performs this routine by a predetermined processing period (for example, 10 ms) during engine operation.

The processing from step S1 to step S12 is similar to the first embodiment, so the explanation will be omitted here.

At step S31, the electronic control unit 200 calculates the crank angle amount Xh from the crank angle corresponding to the injection timing W2 of the secondary fuel injection G2 set at step S5 to the crank angle corresponding to compression top dead center.

At step S32, the electronic control unit 200 calculates the time required for the piston 12 to move by exactly the crank angle amount Xh, that is, the estimated time th (sec) from the injection timing W2 of the secondary fuel injection G2 until the piston 12 reaches compression top dead center. Specifically, the electronic control unit 200 calculates the estimated time th from the following formula (3) based on the crank angle amount Xh and the engine rotational speed N:

$$th = Xh \times (60/N) \times (1/360) \quad (3)$$

At step S33, the electronic control unit 200 judges if the estimated time th is a predetermined time or more (the predetermined time is, for example, prepared/determined in advance by experiments). If the high temperature time th is the predetermined time or more, the electronic control unit 200 proceeds to the processing of step S9. On the other hand, if the high temperature time th is less than the predetermined time, the electronic control unit 200 proceeds to the processing of step S11.

According to the present embodiment explained above, the fuel injection control part of the electronic control unit 200 comprises not only the above-mentioned total fuel injection amount calculating part, injection timing setting part, estimated cylinder temperature calculating part, and fuel ratio setting part, but also an estimated time calculating part (e.g., CPU 204) configured to calculate an estimated time th from the injection timing W2 of the secondary fuel set by the injection timing setting part to when the piston 12 would reach top dead center of compression when the estimated cylinder temperature $T_{W2}$ becomes higher than the high temperature side boundary temperature of the temperature region Z. Further, the fuel ratio setting part is further configured so as to set the ratio of the secondary fuel in the total fuel injection amount $A_{inj}$ so that when the estimated time th is less than a predetermined time, the ratio of the secondary fuel in the total fuel injection amount $A_{inj}$ becomes higher than the ratio of the primary fuel even if the estimated cylinder temperature $T_{W2}$ is higher than the high temperature side boundary temperature of the temperature region Z.

Due to this, by the crank angle at which the cylinder temperature T becomes the high temperature side boundary temperature of the temperature region Z being retarded to near compression top dead center, it is possible to make the ratio of the primary fuel in the total fuel injection amount lower than the ratio of the secondary fuel when the fuel injected by the primary fuel injection G1 would first burn by compression ignition even if secondary fuel injection G2 is performed when the cylinder temperature T is higher than the high temperature side boundary temperature of the temperature region Z. For this reason, it is possible to reduce the slope in the initial period of combustion in the heat generation rate pattern to effectively suppress combustion noise D.

Above, embodiments of the present disclosure were explained, but the embodiments only show some of the examples of application of the present disclosure. The intent is not to limit the technical scope of the present disclosure to the specific constitutions in the above embodiments.

In the above embodiments, when the cylinder temperature $T_{W2}$ was higher than the high temperature side boundary temperature, correction was performed to reduce the basic target injection amount $tA_{inj}2$ of the secondary fuel injection G2 to make the ratio of the secondary fuel in the total fuel injection amount lower than when the cylinder temperature $T_{W2}$ was lower than the high temperature side boundary temperature. However, the method of changing the ratio of the secondary fuel in the total fuel injection amount is not limited to this. For example, when the cylinder temperature $T_{W2}$ is higher than the high temperature side boundary temperature, it is also possible to make the amounts obtained by dividing the total fuel injection amount by corrected division rates of lower division rates for the secondary fuel than the basic division rates the corrected target injection amount $tA_{inj}1'$ of the primary fuel injection G1 and the corrected target injection amount $tA_{inj}2'$ of the secondary fuel injection G2.

Further, in the above embodiments, the primary fuel injection G1 and secondary fuel injection G2 were successively performed from a fuel injector 20 in the entire region of the self ignition region RR to burn fuel by compression ignition two times offset in time so as to suppress combustion noise D. However, when the engine load is less than a predetermined load, that is, when the total fuel injection amount is less than a predetermined amount, even if the total fuel injection amount is made to burn by compression ignition one time, since the total fuel injection amount is small, while divided injection like in the present embodiment would enable the peak value and slope at the initial stage of combustion of the heat generation rate pattern to become smaller and the combustion noise D to be made smaller, it is possible to keep the combustion temperature D at the allowable value or less even without division. Therefore, it is also possible to successively perform the primary fuel injection G1 and secondary fuel injection G2 when the engine load is a predetermined load or more and to inject the total fuel injection amount by a single fuel injection when it is less than a predetermined load.

Further, in the above embodiments, the higher the engine load becomes, the longer the time required for forming the premixed gas S2, so the higher the engine load, the more the injection timing W2 of the secondary fuel injection G2 was made to advance, but it is also possible to make the injection timing W2 of the secondary fuel injection G2 advance the higher the engine load or the higher the engine speed. This is because the higher the engine speed, the faster the speed of rise of the piston, so the shorter the time which can be secured for forming the premixed gas S2.

In some embodiments, one or more operations and/or functionality of the tools and/or engines and/or systems described herein are realized by a processor which is programmed for performing such operations and/or functionality. In some embodiments, the processor is configured as specifically configured hardware (e.g., one or more application specific integrated circuits (ASICs)). An example of the processor includes CPU 204. In some embodiments, the operations and/or functionality are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM (e.g., ROM 202), a RAM (e.g., RAM 203), a memory card, and the like.

The invention claimed is:

1. A control system for controlling an internal combustion engine provided with a fuel injector configured to inject fuel into a cylinder of an engine body, the internal combustion engine having a temperature region, wherein, during chemical reactions of the fuel in a compression stroke in a cycle where premixed gas is made to burn by compression ignition in the cylinder, a change of ignition delay time accompanying a rise in a cylinder temperature of the cylinder when the cylinder temperature is in the temperature region is smaller than when the cylinder temperature is out of the temperature region, the control system comprising a processor configured to control the fuel injector to successively inject primary fuel and secondary fuel into the cylinder to burn the premixed gas by compression ignition inside the cylinder, and when a self ignition timing of the secondary fuel is earlier than a self ignition timing of the primary fuel injected at a predetermined crank angle due to the secondary fuel being injected at a crank angle at which the cylinder temperature is higher than an upper boundary temperature of the temperature region, control a ratio of the secondary fuel in a total fuel injection amount of the primary fuel and secondary fuel to be lower than when the self ignition timing of the secondary fuel is later than the self ignition timing of the primary fuel injected at the predetermined crank angle due to the secondary fuel being injected at a crank angle at which the cylinder temperature is within the temperature region.

2. The control system according to claim 1, wherein the processor is further configured to:
calculate the total fuel injection amount based on an engine load of the internal combustion engine,
set an injection timing of the secondary fuel to be more retarded with respect to an injection timing of the primary fuel as the engine load is decreased,
calculate an estimated cylinder temperature at the set injection timing of the secondary fuel, and
set the ratio of the secondary fuel in the total fuel injection amount to be lower when the estimated cylinder temperature is higher than the upper boundary temperature of the temperature region than when the estimated cylinder temperature is lower than the upper boundary temperature of the temperature region.

3. The control system according to claim 2, wherein the processor is further configured to
set the ratio of the secondary fuel in the total fuel injection amount to be lower than a ratio of the primary fuel in the total fuel injection amount when the estimated cylinder temperature is higher than the upper boundary temperature of the temperature region.

4. The control system according to claim 2, wherein the processor is further configured to
set the ratio of the secondary fuel in the total fuel injection amount to be higher than a ratio of the primary fuel in the total fuel injection amount when the estimated cylinder temperature is not greater than the upper boundary temperature of the temperature region.

5. The control system according to claim 2, wherein the processor is further configured to
calculate a high temperature time when the cylinder temperature is at least the upper boundary temperature of the temperature region during the compression stroke, and
when the high temperature time is less than a predetermined time, set the ratio of the secondary fuel in the total fuel injection amount to be higher than the ratio of the primary fuel in the total fuel injection amount regardless of whether the estimated cylinder temperature is higher than the upper boundary temperature of the temperature region.

6. The control system according to claim 2, wherein the processor is further configured to
when the estimated cylinder temperature is higher than the upper boundary temperature of the temperature region, calculate an estimated time from the set injection timing of the secondary fuel to when a piston in the cylinder reaches top dead center of the compression stroke, and
when the estimated time is less than a predetermined time, set the ratio of the secondary fuel in the total fuel injection amount to be higher than the ratio of the primary fuel in the total fuel injection amount even when the estimated cylinder temperature is higher than the upper boundary temperature of the temperature region.

7. The control system according to claim 2, wherein the upper boundary temperature of the temperature region is 900K.

8. An internal combustion engine, comprising:
an engine body having a cylinder;
a fuel injector configured to inject fuel into the cylinder; and
a control system,
the internal combustion engine having a temperature region, wherein, during chemical reactions of the fuel in a compression stroke in a cycle where premixed gas is made to burn by compression ignition in the cylinder, a change of ignition delay time accompanying a rise in a cylinder temperature of the cylinder when the cylinder temperature is in the temperature region is smaller than when the cylinder temperature is out of the temperature region, the control system comprising a processor configured to
control the fuel injector to successively inject primary fuel and secondary fuel into the cylinder to burn the premixed gas by compression ignition inside the cylinder, and
when a self ignition timing of the secondary fuel is earlier than a self ignition timing of the primary fuel injected at a predetermined crank angle due to the secondary fuel being injected at a crank angle at which the cylinder temperature is higher than an upper boundary temperature of the temperature region,
control a ratio of the secondary fuel in a total fuel injection amount of the primary fuel and secondary fuel to be lower than when the self ignition timing of the secondary fuel is later than the self ignition timing of the primary fuel injected at the predetermined crank angle due to the secondary fuel being injected at a crank angle at which the cylinder temperature is within the temperature region.

9. A method of controlling an internal combustion engine provided with a fuel injector configured to inject fuel into a cylinder of an engine body,
the internal combustion engine having a temperature region, wherein, during chemical reactions of the fuel in a compression stroke in a cycle where premixed gas is made to burn by compression ignition in the cylinder, a change of ignition delay time accompanying a rise in a cylinder temperature of the cylinder when the cylinder temperature is in the temperature region is smaller than when the cylinder temperature is out of the temperature region,
the method comprising:
successively injecting, by the fuel injector, primary fuel and secondary fuel into the cylinder to burn the premixed gas by compression ignition inside the cylinder; and
when a self ignition timing of the secondary fuel is earlier than a self ignition timing of the primary fuel injected at a predetermined crank angle due to the secondary fuel being injected at a crank angle at which the cylinder temperature is higher than an upper boundary temperature of the temperature region,
controlling a ratio of the secondary fuel in a total fuel injection amount of the primary fuel and secondary fuel to be lower than when the self ignition timing of the secondary fuel is later than the self ignition timing of the primary fuel injected at the predetermined crank angle due to the secondary fuel being injected at a crank angle at which the cylinder temperature is within the temperature region.

* * * * *